United States Patent
Motoyama et al.

(10) Patent No.: US 10,908,257 B2
(45) Date of Patent: Feb. 2, 2021

(54) SIGNAL PROCESSING APPARATUS, SIGNAL PROCESSING METHOD, AND PROGRAM

(71) Applicant: Sony Corporation, Tokyo (JP)

(72) Inventors: Takuto Motoyama, Kanagawa (JP); Yasuhiro Sutou, Kanagawa (JP); Toshio Yamazaki, Tokyo (JP); Hideki Oyaizu, Tokyo (JP); Kenichi Kawasaki, Tokyo (JP)

(73) Assignee: Sony Corporation, Tokyo (JP)

( * ) Notice: Subject to any disclaimer, the term of this patent is extended or adjusted under 35 U.S.C. 154(b) by 248 days.

(21) Appl. No.: 15/762,136

(22) PCT Filed: Sep. 16, 2016

(86) PCT No.: PCT/JP2016/077397
§ 371 (c)(1),
(2) Date: Mar. 22, 2018

(87) PCT Pub. No.: WO2017/057041
PCT Pub. Date: Apr. 6, 2017

(65) Prior Publication Data
US 2018/0267142 A1     Sep. 20, 2018

(30) Foreign Application Priority Data

Sep. 30, 2015    (JP) ................................ 2015-194134

(51) Int. Cl.
*G01S 7/40*       (2006.01)
*G01S 13/93*      (2020.01)
(Continued)

(52) U.S. Cl.
CPC .................. *G01S 7/40* (2013.01); *G01C 3/08* (2013.01); *G01C 3/14* (2013.01); *G01S 13/86* (2013.01);
(Continued)

(58) Field of Classification Search
CPC ....................................................... G01S 7/497
See application file for complete search history.

(56) References Cited

U.S. PATENT DOCUMENTS

| 5,633,705 A * | 5/1997 | Asayama ................ G01S 7/497 356/3.14 |
| 7,417,580 B2 * | 8/2008 | Abe ...................... G01S 13/867 342/27 |

(Continued)

FOREIGN PATENT DOCUMENTS

| JP | 2006-011570 A | 1/2006 |
| JP | 2007-218738 A | 8/2007 |

(Continued)

OTHER PUBLICATIONS

Entry for the term "Rotation" in Wikipedia on the Internet. Retrieved on Jun. 29, 2020. (Year: 2020).*

(Continued)

*Primary Examiner* — Bernarr E Gregory
(74) *Attorney, Agent, or Firm* — Wolf, Greenfield & Sacks, P.C.

(57) ABSTRACT

A signal processing apparatus including a first position calculation unit that calculates a three-dimensional position of a target on a first coordinate system from a stereo image captured by a stereo camera, a second position calculation unit that calculates a three-dimensional position of the target on a second coordinate system from a sensor signal of a sensor capable of obtaining position information of at least one of a lateral direction and a longitudinal direction and position information of a depth direction, a correspondence detection unit that detects a correspondence relationship between the target on the first coordinate system and the target on the second coordinate system, and a positional relationship information estimating unit that estimates positional relationship information of the first coordinate system (Continued)

and the second coordinate system on the basis of the detected correspondence relationship.

18 Claims, 25 Drawing Sheets

(51) Int. Cl.
  *G01S 13/86*    (2006.01)
  *G06T 7/73*    (2017.01)
  *H04N 13/246*    (2018.01)
  *H04N 13/239*    (2018.01)
  *G01C 3/08*    (2006.01)
  *G01C 3/14*    (2006.01)
  *G01S 13/931*    (2020.01)
  *G06K 9/00*    (2006.01)
  *G08G 1/16*    (2006.01)
  *B60R 21/00*    (2006.01)
  *G01S 13/00*    (2006.01)

(52) U.S. Cl.
  CPC ............ *G01S 13/867* (2013.01); *G01S 13/93* (2013.01); *G01S 13/931* (2013.01); *G06K 9/00805* (2013.01); *G06T 7/74* (2017.01); *G08G 1/16* (2013.01); *H04N 13/239* (2018.05); *H04N 13/246* (2018.05); *B60R 21/00* (2013.01); *G06T 2207/10012* (2013.01); *G06T 2207/10044* (2013.01); *G06T 2207/30261* (2013.01)

(56) References Cited

U.S. PATENT DOCUMENTS

| | | | | |
|---|---|---|---|---|
| 7,825,849 | B2* | 11/2010 | Tsuchida | G01S 13/931 |
| | | | | 342/70 |
| 9,405,006 | B2* | 8/2016 | Ouchi | G01S 13/867 |
| 2003/0060956 | A1* | 3/2003 | Rao | G01S 13/931 |
| | | | | 701/45 |
| 2006/0155469 | A1* | 7/2006 | Kawasaki | G01S 13/867 |
| | | | | 701/301 |
| 2008/0079954 | A1* | 4/2008 | Iwaki | G01S 13/867 |
| | | | | 356/614 |
| 2008/0106462 | A1* | 5/2008 | Shiraishi | G01S 13/931 |
| | | | | 342/146 |
| 2009/0201192 | A1* | 8/2009 | Tokoro | G01S 13/931 |
| | | | | 342/70 |
| 2010/0256940 | A1 | 10/2010 | Ogawa et al. | |
| 2011/0122257 | A1 | 5/2011 | Kirk | |
| 2012/0218546 | A1 | 8/2012 | Ogawa et al. | |

FOREIGN PATENT DOCUMENTS

JP    2010-151682 A    7/2010
JP    2014-153211 A    8/2014

OTHER PUBLICATIONS

Written Opinion and English translation thereof dated Nov. 15, 2016 in connection with International Application No. PCT/JP2016/077397.
International Preliminary Report on Patentability and English translation thereof dated Apr. 12, 2018 in connection with International Application No. PCT/JP2016/077397.
International Search Report and English translation thereof dated Nov. 15, 2016 in connection with International Application No. PCT/JP2016/077397.
Japanese Office Action dated Sep. 30, 2020 in connection with Japanese Application No. 2017-543132, and English translation thereof.

* cited by examiner

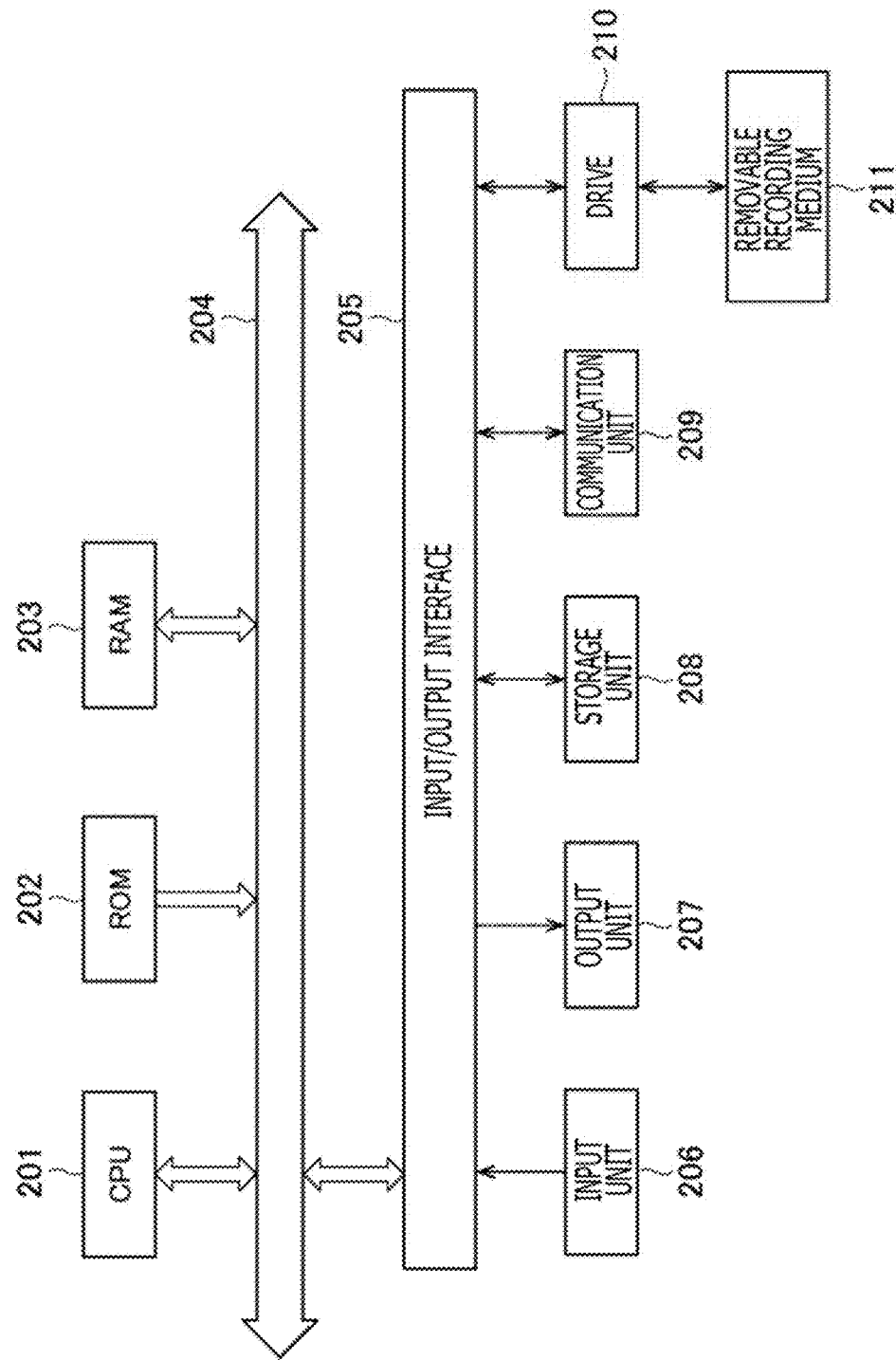

SIGNAL PROCESSING APPARATUS, SIGNAL PROCESSING METHOD, AND PROGRAM

CROSS-REFERENCE TO RELATED APPLICATIONS

This is a U.S. National Stage Application under 35 U.S.C. § 371, based on International Application No. PCT/JP2016/077397, filed in the Japanese Patent Office as a Receiving Office on Sep. 16, 2016, entitled "SIGNAL PROCESSING APPARATUS, SIGNAL PROCESSING METHOD, AND PROGRAM", which claims priority to Japanese Patent Application Number JP2015-194134, filed in the Japanese Patent Office on Sep. 30, 2015, each of which is hereby incorporated by reference in its entirety.

TECHNICAL FIELD

The present technology relates to a signal processing apparatus, a signal processing method, and a program, and particularly relates to a signal processing apparatus, a signal processing method, and a program that enable calibration with high precision.

BACKGROUND ART

In recent years, more and more vehicles such as automobiles have introduced collision avoidance systems. The collision avoidance systems avoid collisions by detecting a car or pedestrian in front and automatically performing brake control or the like.

An object such as a car or pedestrian in front is detected through image recognition of an image captured by a stereo camera or using radar information provided by a millimeter-wave radar, a laser radar or the like. Further, the development of object detection systems using both a stereo camera and a radar, which is called sensor fusion, is also advancing.

Sensor fusion needs calibration of the coordinate system of the stereo camera and the coordinate system of the radar to match an object detected by the stereo camera and an object detected by the radar. For example, PTL 1 proposes a method of performing calibration for sensor fusion by using a board (reflective board) dedicated to calibration.

CITATION LIST

Patent Literature

[PTL 1]
JP 2007-218738A

SUMMARY

Technical Problem

However, since the detection points are limited to where the calibration-dedicated board is arranged, the calibration method using the calibration-dedicated board as in PTL 1 has a limitation in calibration precision.

The present technology has been made in view of the foregoing circumstances and enables calibration with high precision.

Solution to Problem

A signal processing apparatus according to an aspect of the present technology includes a first position calculation unit that calculates a three-dimensional position of a target on a first coordinate system from a stereo image captured by a stereo camera, a second position calculation unit that calculates a three-dimensional position of the target on a second coordinate system from a sensor signal of a sensor capable of obtaining position information of at least one of a lateral direction and a longitudinal direction and position information of a depth direction, a correspondence detection unit that detects a correspondence relationship between the target on the first coordinate system and the target on the second coordinate system, and a positional relationship information estimating unit that estimates positional relationship information of the first coordinate system and the second coordinate system on the basis of the detected correspondence relationship.

A signal processing method according to an aspect of the present technology includes the steps of calculating a three-dimensional position of a target on a first coordinate system from a stereo image captured by a stereo camera, calculating a three-dimensional position of the target on a second coordinate system from a sensor signal of a sensor capable of obtaining position information of at least one of a lateral direction and a longitudinal direction and position information of a depth direction, detecting a correspondence relationship between the target on the first coordinate system and the target on the second coordinate system, and estimating positional relationship information of the first coordinate system and the second coordinate system on the basis of the detected correspondence relationship.

A program according to an aspect of the present technology causes a computer to execute a process including the steps of calculating a three-dimensional position of a target on a first coordinate system from a stereo image captured by a stereo camera, calculating a three-dimensional position of the target on a second coordinate system from a sensor signal of a sensor capable of obtaining position information of at least one of a lateral direction and a longitudinal direction and position information of a depth direction, detecting a correspondence relationship between the target on the first coordinate system and the target on the second coordinate system, and estimating positional relationship information of the first coordinate system and the second coordinate system on the basis of the detected correspondence relationship.

In an aspect of the present technology, a three-dimensional position of a target on a first coordinate system from a stereo image captured by a stereo camera is calculated, a three-dimensional position of the target on a second coordinate system from a sensor signal of a sensor capable of obtaining position information of at least one of a lateral direction and a longitudinal direction and position information of a depth direction is calculated, a correspondence relationship between the target on the first coordinate system and the target on the second coordinate system is detected, and positional relationship information of the first coordinate system and the second coordinate system on the basis of the detected correspondence relationship is estimated.

Note that the program can be provided by being transmitted via a transmission medium or by being recorded in a recording medium.

The signal processing apparatus may be an independent apparatus or may be an internal block constituting one apparatus.

Advantageous Effect of Invention

An aspect of the present technology enables calibration with high precision.

Note that the effect described herein is not necessarily limitative, and any of the effects described in the present disclosure may be exhibited.

BRIEF DESCRIPTION OF DRAWINGS

FIG. 28 is a block diagram illustrating an exemplary configuration of an embodiment of a computer to which the present technology is applied.

DESCRIPTION OF EMBODIMENTS

Hereinafter, a mode for carrying out the present technology (hereinafter referred to as an embodiment) will be described. Note that the description will be made in the following order.

1. Exemplary Configuration of Object Detection System
2. Detailed Description of Correspondence Detection Process
3. Calibration Process during Operation
4. Process Flow of Calibration Process
5. Examples of Targets in Calibration Process at Shipment
6. Examples of Targets in Calibration Process during Operation
7. Exemplary Computer Configuration <1. Exemplary Configuration of Object Detection System>

Figure 1:
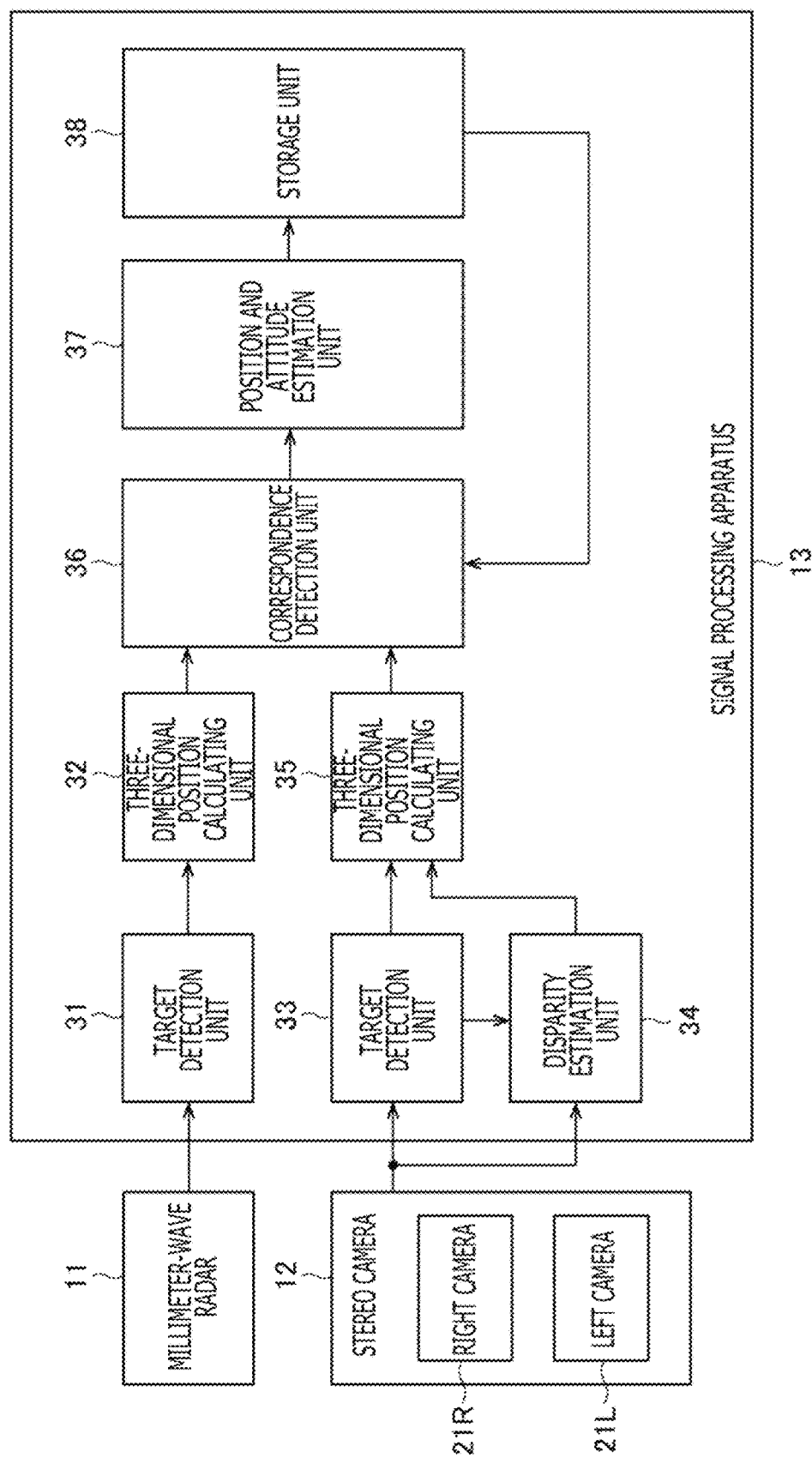
FIG. 1 is a block diagram illustrating an exemplary configuration of an object detection system to which the present technology is applied.

FIG. 1 is a block diagram illustrating an exemplary configuration of an object detection system to which the present technology is applied.

An object detection system 1 in FIG. 1 includes a millimeter-wave radar 11, a stereo camera 12, and a signal processing apparatus 13, and is a system that detects an object to become an obstacle individually using the millimeter-wave radar 11 and the stereo camera 12. The object detection system 1 is mounted in a vehicle such as, for example, an automobile or a truck.

Note that, in the present embodiment, although a description will be given of the case where the millimeter-wave radar 11 and the stereo camera 12 are mounted such that the detection direction thereof faces the front of the vehicle to detect an object in front of the vehicle, the object detection direction is not limited to the front of the vehicle. For example, where the millimeter-wave radar 11 and the stereo camera 12 are mounted so as to face the rear of the vehicle, the object detection system 1 detects an object in the rear of the vehicle.

The millimeter-wave radar 11 emits a millimeter wave in a predetermined direction θ, obtains a reflected wave that collides with a given object and returns therefrom, and supplies a reflected signal depending on the obtained reflected wave to the signal processing apparatus 13. The millimeter-wave radar 11 performs millimeter wave scanning within a predetermined angular range in front of the vehicle, and supplies the resultant reflected signal as well as the irradiation direction θ to the signal processing apparatus 13. In the present embodiment, a unit of scanning the predetermined angular range one time in the millimeter-wave radar 11 will be referred to as a frame.

The stereo camera 12 includes a right camera 21R and a left camera 21L. The right camera 21R and the left camera 21L are arranged at the same height and spaced apart at a predetermined interval in the lateral direction. The right camera 21R and the left camera 21L capture images in a predetermined range in front of the vehicle. The image captured by the right camera 21R (hereinafter also referred to as a right-camera image) and the image captured by the left camera 21L (hereinafter also referred to as a left-camera image) are images with disparity (difference in the lateral direction) due to the difference in the arranged positions. Note that the positional relationship between the right camera 21R and the left camera 21L is accurately calibrated. Hereinafter, the right-camera image and the left-camera image will also be referred to as a stereo image when not particularly distinguished from each other.

The signal processing apparatus 13 performs signal processing on a sensor signal output from each of sensors of the millimeter-wave radar 11 and the stereo camera 12. It is assumed that the millimeter-wave radar 11 and the stereo camera 12 are temporally synchronized to some extent upon sensing.

The signal processing apparatus 13 includes a target detection unit 31, a three-dimensional position calculating unit 32, a target detection unit 33, a disparity estimation unit 34, a three-dimensional position calculating unit 35, a correspondence detection unit 36, a position and attitude estimation unit 37, and a storage unit 38.

For accurate object detection, the object detection system 1 needs to identify a correspondence relationship between the objects individually detected by the millimeter-wave radar 11 and the stereo camera 12. That is, the detected objects are represented by the coordinate systems that differ between the millimeter-wave radar 11 and the stereo camera 12. In a case where the detected objects are identical, the coordinate values of the objects detected by the millimeter-wave radar 11 and the stereo camera 12 need to be converted into a predetermined single coordinate system so as to be the same values.

The signal processing apparatus 13 performs a process for calculating a correspondence relationship between the coordinate system of the millimeter-wave radar 11 and the coordinate system of the stereo camera 12. In other words, the signal processing apparatus 13 calculates a relationship (position and attitude) of the position of one of the millimeter-wave radar 11 and the stereo camera 12 to the position of the other.

The calibration process for calculating the positional relationship between the millimeter-wave radar 11 and the stereo camera 12, which is performed by the signal processing apparatus 13, includes a pre-shipment calibration process and a calibration process during operation. The pre-shipment calibration process is executed before the vehicle is shipped. The calibration process during operation is for adjusting deviation generated after shipment. The deviation after shipment is, for example, conceivably caused by temporal change, heat, vibration or the like.

In the pre-shipment calibration process, objects detected by the millimeter-wave radar 11 and the stereo camera 12 are prepared in advance as targets. The targets in the pre-shipment calibration process are, for example, poles or the like having a texture (pattern) whose positions can be uniquely identified in a stereo image captured by the stereo camera 12 and reflecting a millimeter wave.

Figure 2:
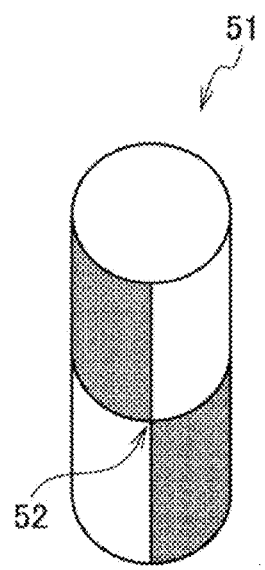
FIG. 2 is a view illustrating an exemplary target used for a pre-shipment calibration process.

FIG. 2 illustrates an exemplary target used for the pre-shipment calibration process.

A target 51 illustrated in FIG. 2 is a cylindrically-shaped pole formed of a material that reflects a millimeter wave. A texture in a checkered pattern is formed on the cylindrically-shaped outer periphery. In a case where the target detection unit 33 calculates the position of the target 51 in the stereo image, for example, the target detection unit 33 calculates the pixel position of an intersection point 52 of the checkered pattern by pattern matching, feature extraction or the like.

Figure 3:
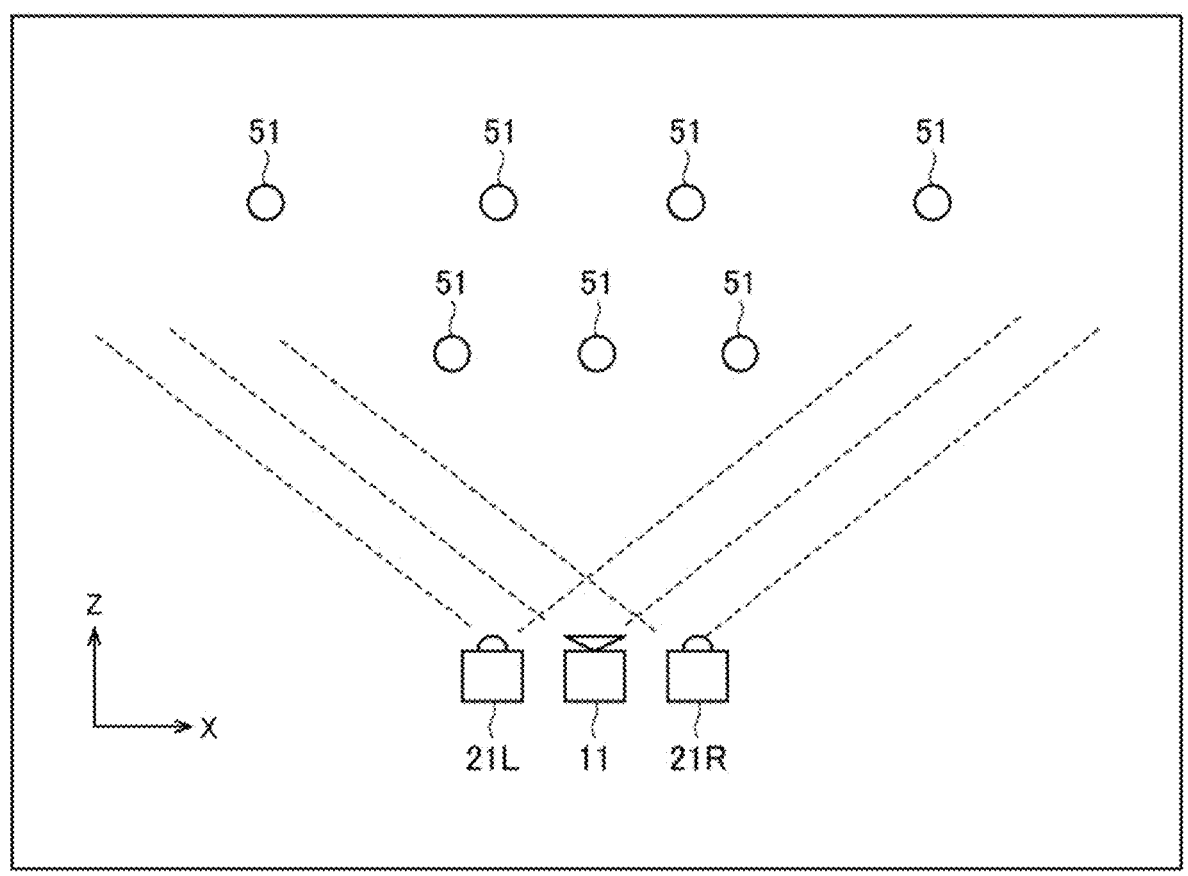
FIG. 3 is a diagram illustrating an exemplary arrangement of targets in the pre-shipment calibration process.
Figure 4:
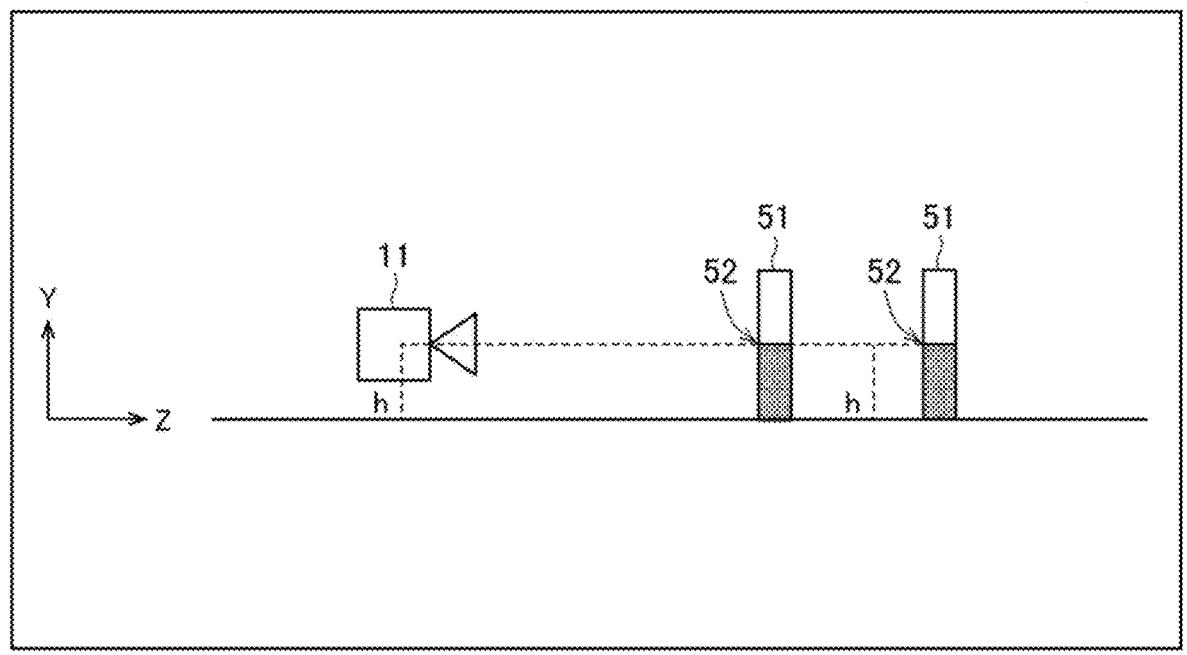
FIG. 4 is a diagram illustrating the exemplary arrangement of the targets in the pre-shipment calibration process.

FIGS. 3 and 4 illustrate an exemplary arrangement of targets 51 in the pre-shipment calibration process.

FIG. 3 is an arrangement diagram of the targets 51 in the pre-shipment calibration process when the targets 51 are viewed from above.

In FIG. 3, the longitudinal direction of the drawing is the Z-axis, the lateral direction of the drawing is the X-axis, and the direction vertical to the drawing is the Y-axis. The longitudinal direction is in the forward direction (depth direction) of the vehicle. The lateral direction is in the lateral direction (horizontal direction) of the vehicle.

In the pre-shipment calibration process, the plurality of targets 51 is arranged such that the plurality of targets 51 does not overlap each other when captured by the stereo camera 12. Desirably, furthermore, each of the plurality of targets 51 is arranged so as not to be at the same position as the other targets 51 in either one of the X-axis direction and the Z-axis direction, as illustrated in FIG. 3.

FIG. 4 is an arrangement diagram of the targets 51 in the pre-shipment calibration process when the targets 51 are viewed from the lateral direction.

In FIG. 4, the lateral direction of the drawing is the Z-axis, the longitudinal direction of the drawing is the Y-axis, and the direction vertical to the drawing is the X-axis.

Assume that the millimeter-wave radar 11 is arranged so as to irradiate the XZ plane at a height h from the ground with the millimeter wave. In this case, the plurality of targets 51 is arranged such that intersection points 52 of the targets 51 are at the height h of the millimeter wave, as illustrated in FIG. 4. In other words, the intersection points 52 in the checkered pattern of the targets 51 are formed so as to match the height h of the millimeter wave emitted by the millimeter-wave radar 11.

Note that although the stereo camera 12 may also be arranged such that the center of the imaging is at the position of the height h from the ground, which is the same as the intersection points 52 in the checkered pattern, so as to match the height position of the millimeter-wave radar 11, the stereo camera 12 is not necessarily arranged to match the height position of the millimeter-wave radar 11.

In the calibration process during operation, on the other hand, it is not possible to specify a predetermined fixed object as the target. Accordingly, an object that exists on a path in which the vehicle travels serves as the target. For example, a pedestrian or a pole such as a sign or a utility pole serves as the target in the calibration process during operation.

Note that calculation of the positional relationship between the millimeter-wave radar 11 and the stereo camera 12 needs position information of a plurality of targets at different positions. The position information of the plurality of targets may be individually obtained by the millimeter-wave radar 11 and the stereo camera 12 detecting the plurality of targets in one frame or by preparing a plurality of frames, each of which captures a single target.

The target detection unit 31 and the three-dimensional position calculating unit 32 on the millimeter-wave radar 11 side will be described with reference to FIG. 5.

The target detection unit 31 detects the positions of the targets in front of the vehicle on the basis of the reflected signals and the irradiation directions θ supplied from the millimeter-wave radar 11. More specifically, the target detection unit 31 detects, as the target detection positions, peak positions whose reflected signal intensities are equal to or higher than a predetermined intensity on the basis of a reflection intensity map in which the intensities of the reflected signals and the irradiation directions θ are associated with each other. The target detection positions are represented by a polar coordinate system including a distance L based on the intensity of the reflected signal and the irradiation direction θ. The detected target detection positions are supplied to the three-dimensional position calculating unit 32.

Figure 5:
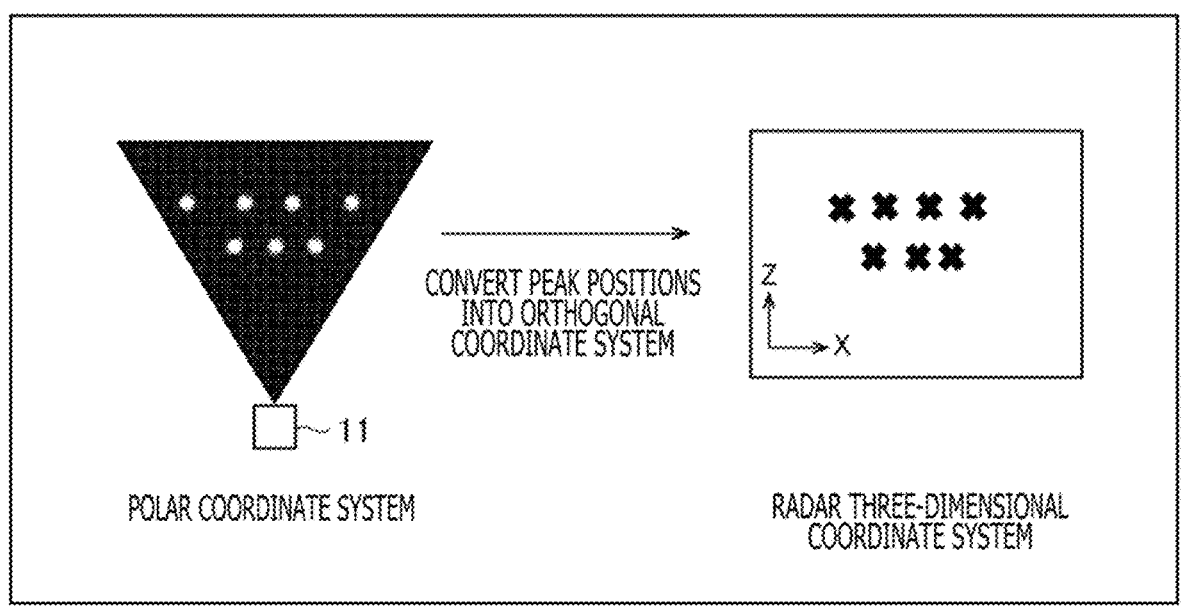
FIG. 5 is a diagram for describing a target detection unit and a three-dimensional position calculating unit.

In FIG. 5, a black triangle expanding from the millimeter-wave radar 11 indicates an irradiation range of the millimeter-wave wave, while the positions where the targets are detected are indicated in white. The higher the intensity of the reflected signal, the more it is expressed in white.

The three-dimensional position calculating unit 32 converts the target detection positions represented by the polar coordinate system and supplied from the target detection unit 31 into the target detection positions on a three-dimensional coordinate system in which the forward direction (depth direction) of the vehicle is the Z-axis, the lateral direction (horizontal direction) is the X-axis, and the longitudinal direction (vertical direction) is the Y-axis.

That is, the target detection positions represented by the polar coordinate system including the distance L based on the intensity of the reflected signal and the irradiation direction θ are converted into an orthogonal coordinate system by the three-dimensional position calculating unit 32 so as to be converted into the target detection positions on the XZ plane of the three-dimensional coordinate system.

Here, the calculated target detection positions are the positions on the three-dimensional coordinate system relative to the millimeter-wave radar 11, and the three-dimensional coordinate system relative to the millimeter-wave radar 11 will also be referred to as a radar three-dimensional coordinate system to be distinguished from a three-dimensional coordinate system relative to the stereo camera 12 to be described later.

The three-dimensional position calculating unit 32 supplies the calculated target detection positions represented by the radar three-dimensional coordinate system to the correspondence detection unit 36.

The target detection unit 33, the disparity estimation unit 34, and the three-dimensional position calculating unit 35 on the stereo camera 12 side will be described with reference to FIG. 6.

The target detection unit 33 detects the positions of the targets on the two-dimensional coordinate system including the X-axis and the Y-axis by performing, on the stereo image supplied from the right camera 21R and the left camera 21L, pattern matching (image recognition process) with a preliminarily registered pattern (shape or texture) or a feature detection process that detects the features of the target image.

Relative to either one of the right-camera image supplied from the right camera 21R and the left-camera image supplied from the left camera 21L (left-camera image in the present embodiment), the target detection unit 33 detects the positions of the intersection points 52 of the targets 51 in the left-camera image with pixel-level precision, and supplies the positions to the three-dimensional position calculating unit 35.

The disparity estimation unit 34 calculates disparity from the right-camera image supplied from the right camera 21R and the left-camera image supplied from the left camera 21L and supplies the calculation result to the three-dimensional position calculating unit 35 as disparity information.

Figure 6:
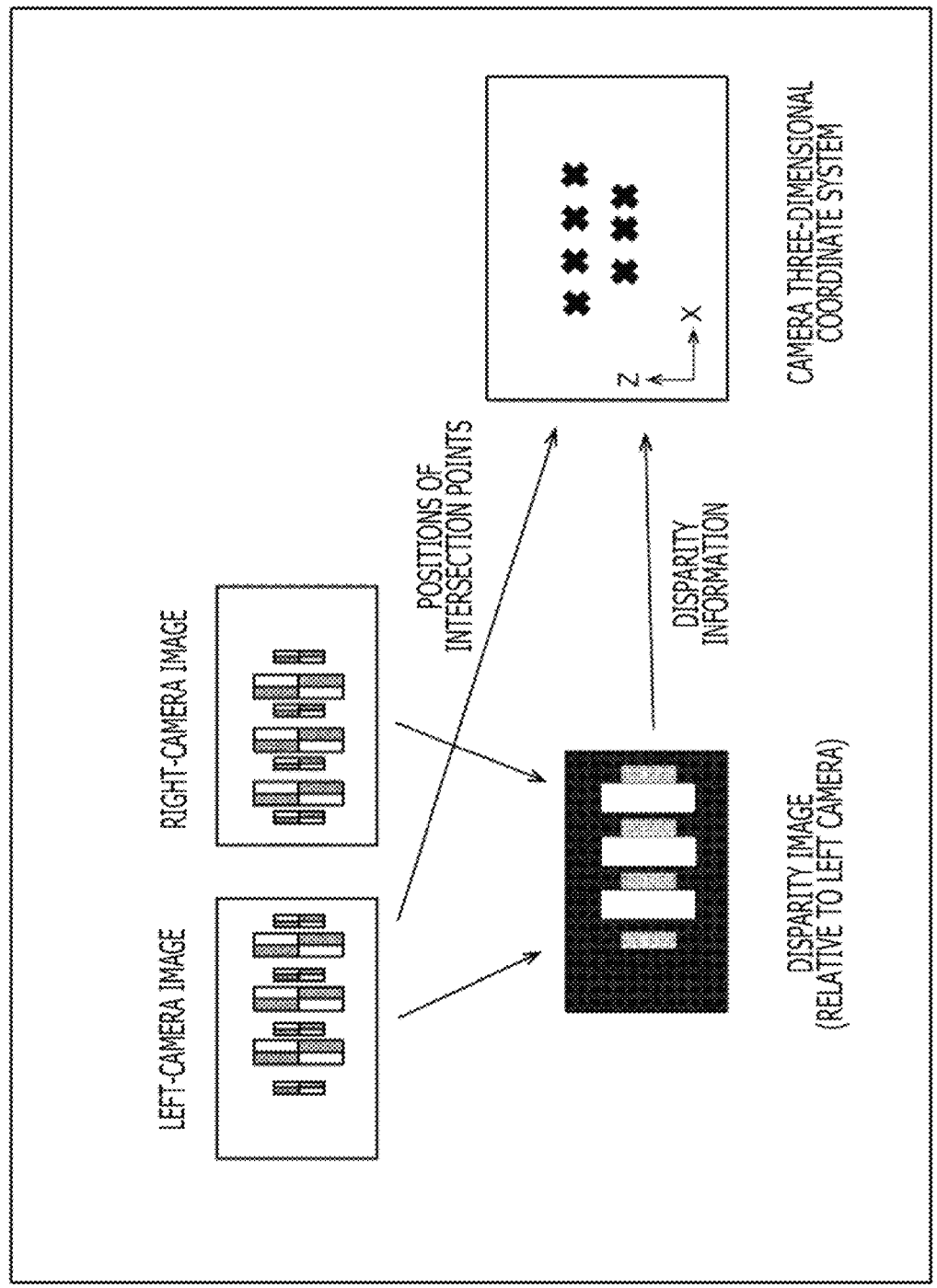
FIG. 6 is a diagram for describing a target detection unit, a disparity estimation unit, and a three-dimensional position calculating unit.

FIG. 6 illustrates a disparity image expressed by luminance values. The luminance values are higher as the disparity relative to the left-camera image, which is calculated from the right-camera image and the left-camera image, is greater. The disparity image in FIG. 6 indicates that the higher the luminance value, the closer the distance to the corresponding target 51.

The three-dimensional position calculating unit 35 calculates the positions (distances) in the Z-axis direction, which is the forward direction of the vehicle, on the basis of the disparity information of the targets supplied from the disparity estimation unit 34. Then, the three-dimensional position calculating unit 35 calculates the target detection positions on the three-dimensional coordinate system from the positions of the calculated targets in the Z-axis direction and the positions of the targets on the two-dimensional coordinate system (XY plane) supplied from the target detection unit 33. In the three-dimensional coordinate system, the forward direction (depth direction) of the vehicle is the Z-axis, the lateral direction (horizontal direction) is the X-axis, and the longitudinal direction (vertical direction) is the Y-axis. The target detection positions calculated here are the positions on the three-dimensional coordinate system relative to the stereo camera 12, and have the same the axis directions as the radar three-dimensional coordinate system but have a different point of origin from the radar three-dimensional coordinate system. The three-dimensional coordinate system relative to the stereo camera 12 will also be referred to as a camera three-dimensional coordinate system to be distinguished from the radar three-dimensional coordinate system described above. Further, where distinction between the radar three-dimensional coordinate system and the camera three-dimensional coordinate system is not particularly necessary, both will also be collectively referred to as a sensor coordinate system.

The three-dimensional position calculating unit 35 supplies the calculated target detection positions represented by the camera three-dimensional coordinate system to the correspondence detection unit 36.

The correspondence detection unit 36 detects correspondence relationships between the targets detected on the radar three-dimensional coordinate system and the targets detected on the camera three-dimensional coordinate system. In other words, the correspondence detection unit 36 detects which target detected on the camera three-dimensional coordinate system corresponds to the target detected on the radar three-dimensional coordinate system.

In the pre-shipment calibration process using the targets preliminarily prepared, the arrangement of the targets is known in advance. In this case, the correspondence detection unit 36 obtains prior arrangement information of the targets from the storage unit 38 and individually collates the target detection positions detected on the radar three-dimensional coordinate system and the target detection positions detected on the camera three-dimensional coordinate system with the obtained target prior arrangement information. After identifying the targets, the correspondence detection unit 36 detects the correspondence relationships between the targets detected on the radar three-dimensional coordinate system and the targets detected on the camera three-dimensional coordinate system.

Figure 7:
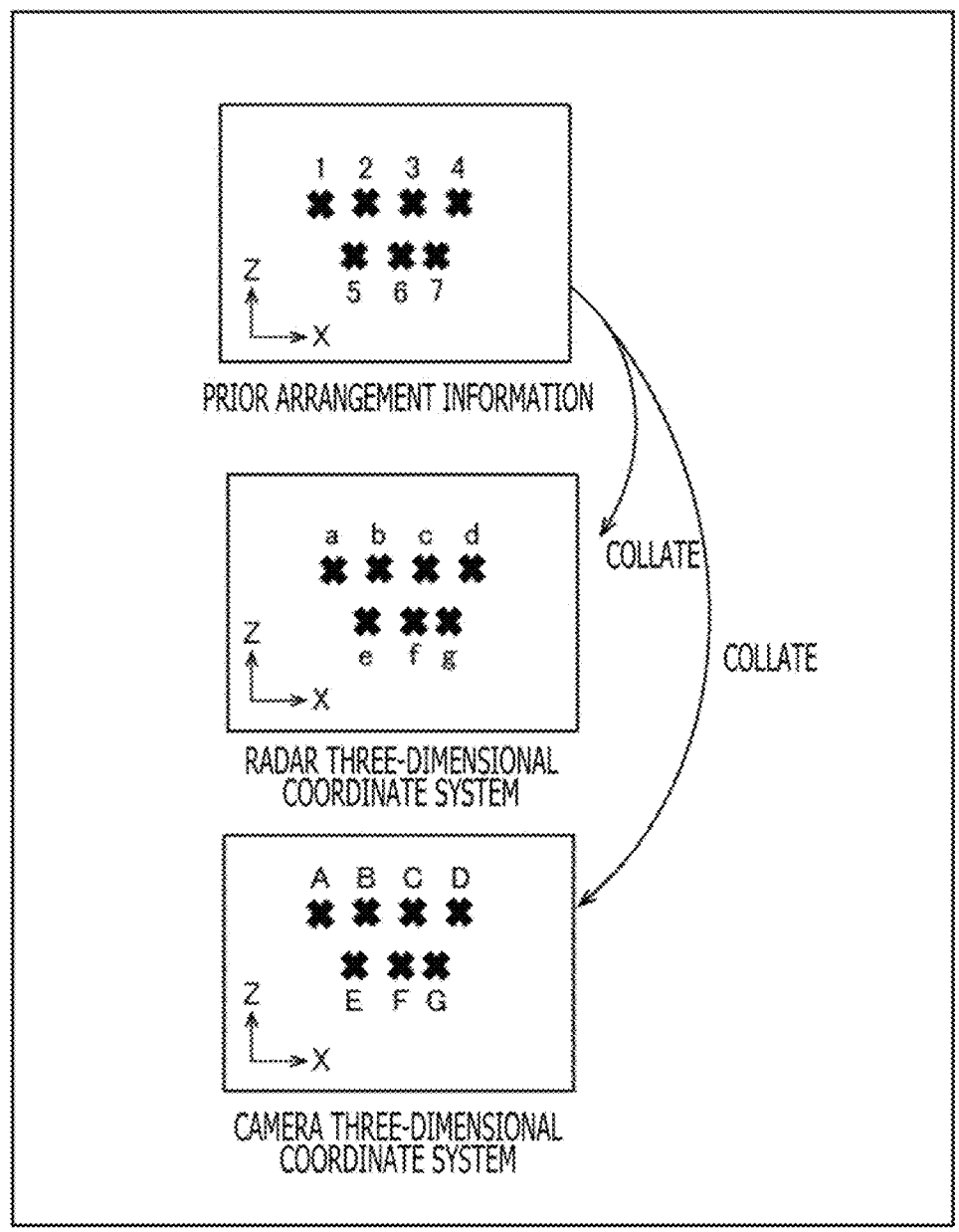
FIG. 7 is a diagram for describing a correspondence detection unit.

Specifically, as illustrated in FIG. 7, for example, the correspondence detection unit 36 detects that a target detection position a detected on the radar three-dimensional coordinate system corresponds to a target position 1 in the target prior arrangement information, a target detection position b corresponds to a target position 2, and similarly, subsequent target detection positions c to g correspond one-to-one to target positions 3 to 7.

Further, the correspondence detection unit 36 detects that a target detection position A detected on the camera three-dimensional coordinate system corresponds to the target position 1 in the target prior arrangement information, a target detection position B corresponds to the target position 2, and similarly, subsequent target detection positions C to G correspond one-to-one to the target positions 3 to 7.

As a result, the correspondence detection unit 36 detects that the target at the target detection position a detected on the radar three-dimensional coordinate system and the target at the target detection position A detected on the camera three-dimensional coordinate system correspond to each other. Similarly, the correspondence detection unit 36 individually detects that the targets at the target detection positions b to g detected on the radar three-dimensional coordinate system and the targets at the target detection positions B to G detected on the camera three-dimensional coordinate system correspond to each other.

By contrast, in the calibration process during operation where it is not possible to obtain the target arrangement information, the correspondence detection unit 36 detects a correspondence relationship between a target detected on the radar three-dimensional coordinate system and a target detected on the camera three-dimensional coordinate system by comparing the target detection position detected on the radar three-dimensional coordinate system with the target detection position detected on the camera three-dimensional coordinate system on the basis of the positional relationship which has already been obtained through the pre-shipment calibration process or calibration process during operation executed before.

The position and attitude estimation unit 37 calculates a positional relationship between the millimeter-wave radar 11 and the stereo camera 12 using the plurality of targets whose correspondence relationships have been identified by the correspondence detection unit 36.

Figure 8:
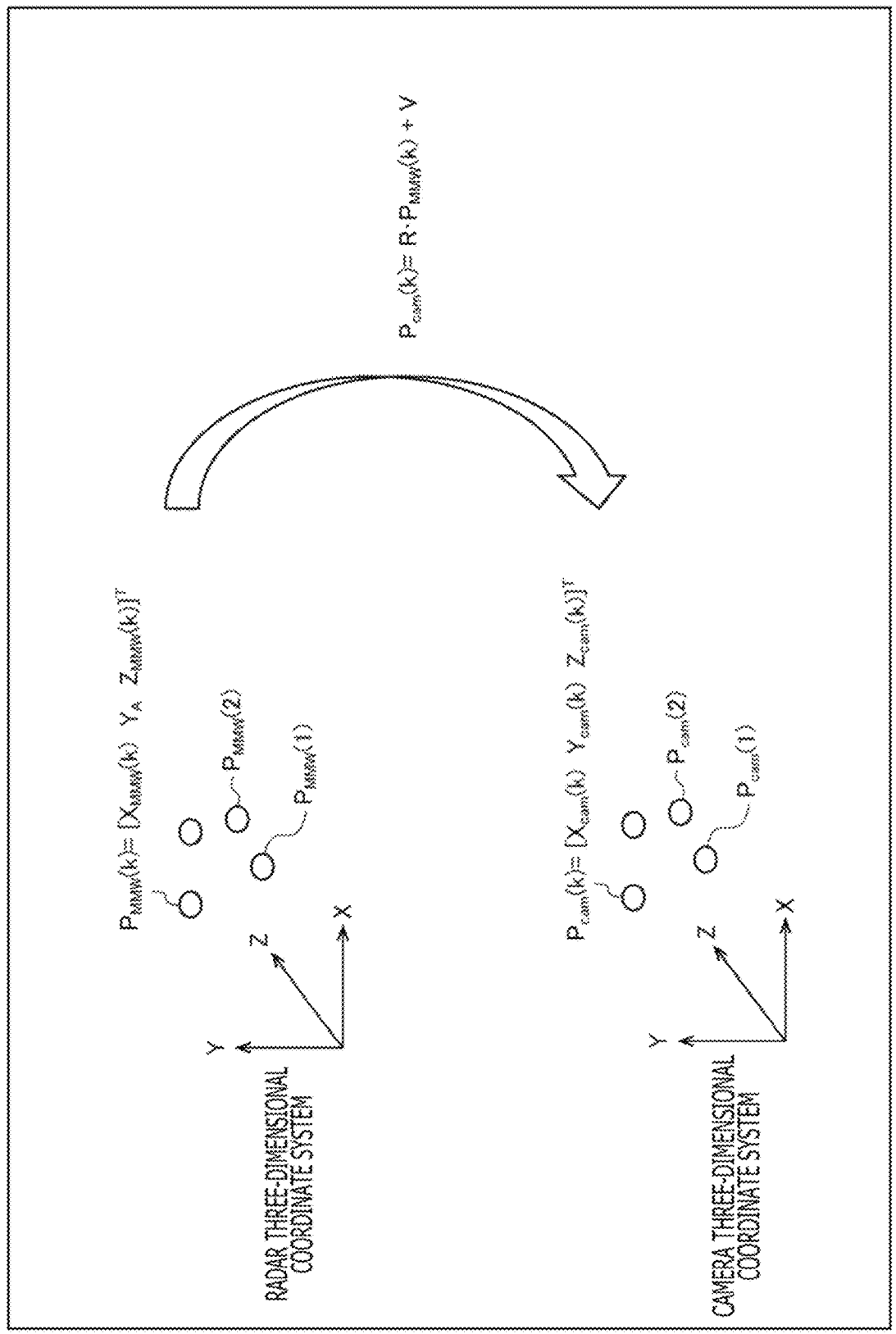
FIG. 8 is a diagram for describing a position and attitude estimation unit.

Specifically, as illustrated in FIG. 8, the position of the k-th target (0<k<K+1) among K targets whose correspondence relationships have been identified by the correspondence detection unit 36 is represented as $P_{MMW}(k)=[X_{MMW}(k)\ Y_A\ Z_{MMW}(k)]^T$ on the radar three-dimensional coordinate system and represented as $P_{cam}(k)=[X_{cam}(k)\ Y_{cam}(k)\ Z_{cam}(k)]^T$ on the camera three-dimensional coordinate system, where T represents transposition and $Y_A$ represents a predetermined fixed value.

The position and attitude estimation unit 37 calculates a rotation matrix R and a translation vector V of the equation (1) by substituting each of the K targets into the equation (1) representing the positional relationship between the target position $P_{MMW}(k)$ on the radar three-dimensional coordinate system and the target position $P_{cam}(k)$ on the camera three-dimensional coordinate system, and solving an optimization problem using the method of least squares and the like.

$$P_{cam}(k)=R \cdot P_{MMW}(k)+V \qquad (1)$$

In the equation (1), k is a variable (0<k<K+1) that identifies a predetermined one of the plurality (K) of targets, $P_{cam}(k)$ represents the target detection position of the k-th target detected on the camera three-dimensional coordinate system, and $P_{MMW}(k)$ represents the target detection position of the k-th target detected on the radar three-dimensional coordinate system.

The equation (1) corresponds to the equation for converting the target detection position $P_{MMW}(k)$ of the k-th target detected on the radar three-dimensional coordinate system into the target detection position $P_{cam}(k)$ on the camera three-dimensional coordinate system. The rotation matrix R represents the attitude of the millimeter-wave radar 11 relative to the stereo camera 12. The translation vector V represents the position of the millimeter-wave radar 11 relative to the stereo camera 12.

The number of variables of the rotation matrix R is three and the number of variables of the translation vector V is three. Therefore, as long as at least six target detection positions can be obtained, the rotation matrix R and translation vector V of the equation (1) can be calculated. Note that the rotation matrix R can not only be solved by using the method of least squares but also by being represented with quaternions.

The storage unit 38 stores the positional relationship information (calibration information) on the millimeter-wave radar 11 and the stereo camera 12 calculated by the position and attitude estimation unit 37. Specifically, the storage unit 38 stores the rotation matrix R and the translation vector V of the equation (1) supplied from the position and attitude estimation unit 37.

The object detection system 1 is configured as above.

<2. Detailed Description of Correspondence Detection Process>

<First Correspondence Detection Process>

Next, a first correspondence detection process using the prior arrangement information of the targets that the correspondence detection unit 36 performs will be described in more detail.

Figure 9:
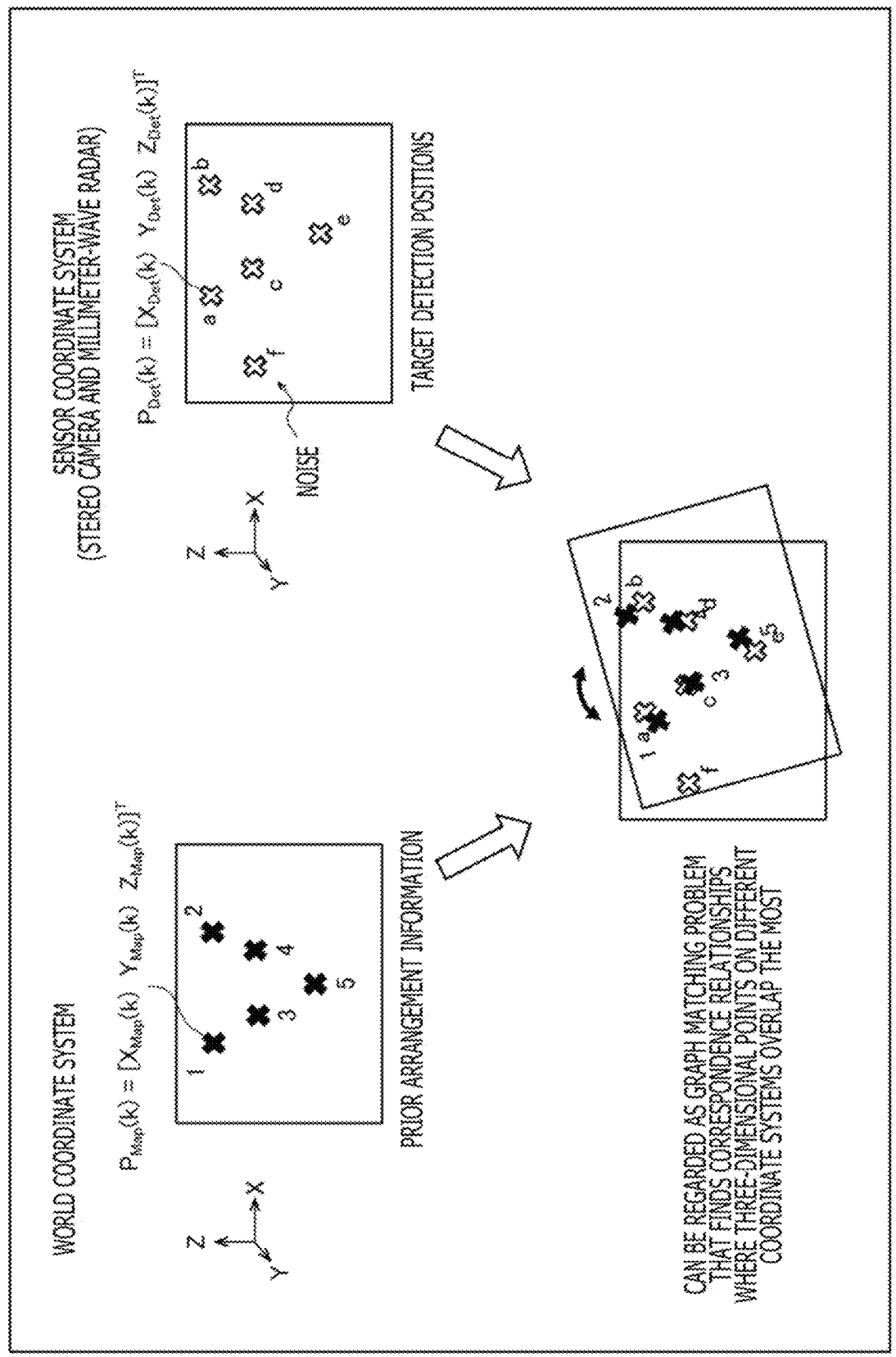
FIG. 9 is a diagram for describing a first correspondence detection process.

As illustrated in FIG. 9, it is assumed that the position of the k-th target is represented as $P_{MAP}(k)=[X_{MAP}(k)\ Y_{MAP}(k)\ Z_{MAP}(k)]^T$ in the prior arrangement information of the targets on a world coordinate system with a predetermined location as the point of origin, while the position of the k-th target is represented as $P_{Det}(k)=[X_{Det}(k)\ Y_{Det}(k)\ Z_{Det}(k)]^T$ on the sensor coordinate system of the millimeter-wave radar 11 or the stereo camera 12.

Note that where the sensor coordinate system is the radar three-dimensional coordinate system, $Y_{Det}(k)$ is a fixed value as described above. Further, although the number of targets is K, there are cases where K or more targets are detected due to the influence of disturbance or the like on the sensor coordinate system of the millimeter-wave radar 11 or the stereo camera 12. In the example in FIG. 9, although there are five targets in the prior arrangement information, a target position f is detected as a target on the sensor coordinate system due to noise, for example, resulting in the detection of six targets at the target detection positions a to f.

In this way, the detection of the correspondence relationships between the five target positions 1 to 5 on the world coordinate system and the six target detection positions a to f on the sensor coordinate system can be solved by being regarded as a graph matching problem that finds correspondence relationships where three-dimensional points on different coordinate systems overlap the most.

Figure 10:
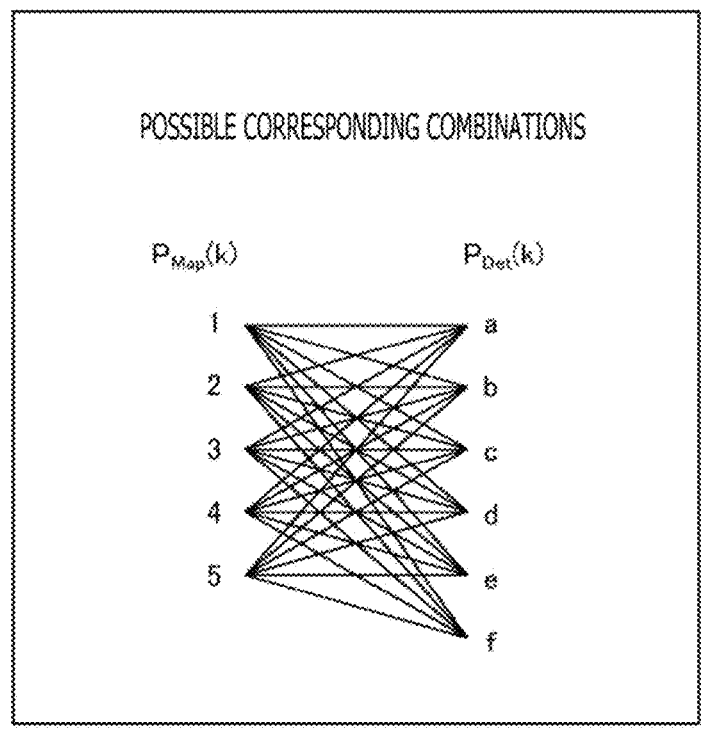
FIG. 10 is a diagram for describing the first correspondence detection process.

The possible corresponding combinations of the five target positions 1 to 5 on the world coordinate system and the six target detection positions a to f on the sensor coordinate system are as illustrated in FIG. 10.

When the correspondence relationships (connections) between the five target positions 1 to 5 on the world coordinate system and the six target detection positions a to f on the sensor coordinate system are represented by a matrix variable X with M rows and N columns, the correspondence relationships can be represented by the following equation (2).

[Math. 1]

$$X = \begin{bmatrix} x_{0,0} & \Lambda & x_{0,N} \\ M & O & M \\ x_{M,0} & \Lambda & x_{M,N} \end{bmatrix} \qquad (2)$$

$$x_{i,j} \in \{0, 1\}, \sum_{i}^{M} x_{i,j} = 1$$

In the equation (2), M is the number of targets on the world coordinate system (M=5 in the example in FIG. 9), while N is the number of targets on the sensor coordinate system (N=6 in the example in FIG. 9). Further, the index i of x represents a variable (0<i<M+1) that identifies a target on the world coordinate system, while the index j of x represents a variable (0<j<N+1) that identifies a target on the sensor coordinate system. $x_{i,j}$ represents whether the i-th target on the world coordinate system and the j-th target on the sensor coordinate system are connected, and is a variable that takes "1" when connected while "0" when not connected.

Figure 11:
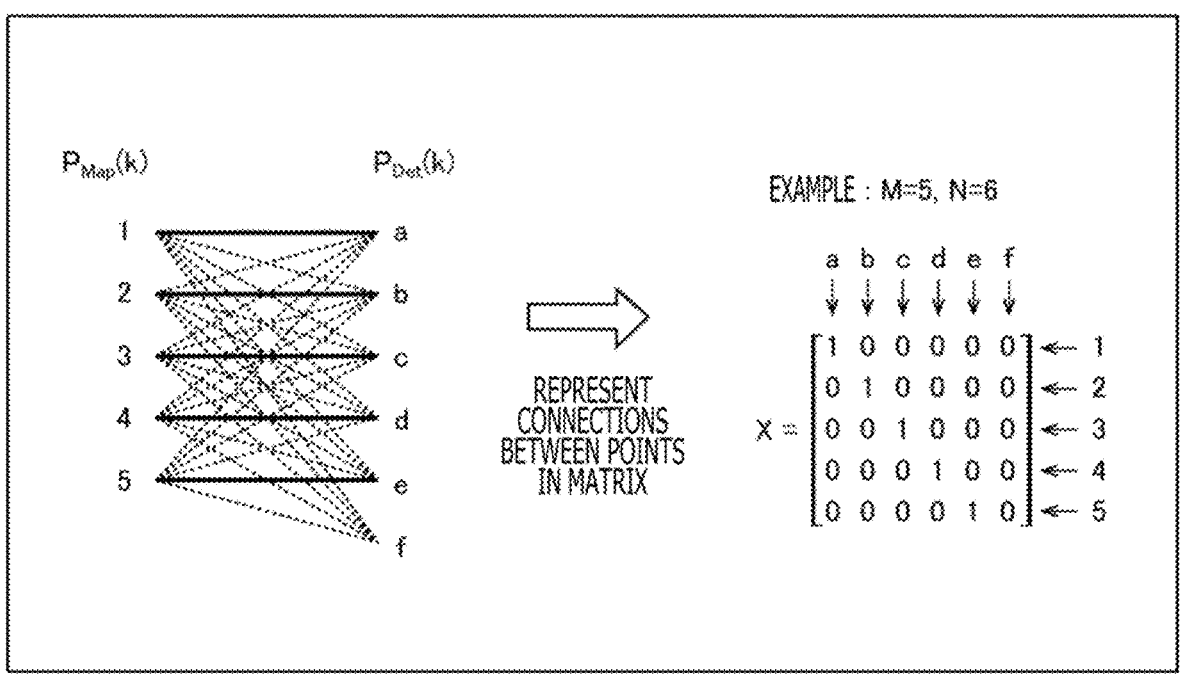
FIG. 11 is a diagram for describing the first correspondence detection process.

For example, as indicated by the bold solid lines in FIG. 11, where the target position 1 on the world coordinate system and the target detection position a on the sensor coordinate system, the target position 2 on the world coordinate system and the target detection position b on the sensor coordinate system, the target position 3 on the world coordinate system and the target detection position c on the sensor coordinate system, the target position 4 on the world coordinate system and the target detection position d on the sensor coordinate system, and the target position 5 on the world coordinate system and the target detection position e on the sensor coordinate system correspond to each other, the matrix variable X representing the correspondence relationships is represented as below.

[Math. 2]

$$X = \begin{bmatrix} 1 & 0 & 0 & 0 & 0 & 0 \\ 0 & 1 & 0 & 0 & 0 & 0 \\ 0 & 0 & 1 & 0 & 0 & 0 \\ 0 & 0 & 0 & 1 & 0 & 0 \\ 0 & 0 & 0 & 0 & 1 & 0 \end{bmatrix}$$

Then, the correspondence detection unit 36 obtains X that maximizes a score function score (X) using the matrix variable X represented by the equation (2). The score function score (X) is represented by the following equation (3).

[Math. 3]

$$\max \text{score}(X) = \sum_{i1,i2,j1,j2} S(l_{i1,i2}, h_{j1,j2}) x_{i1,j1} x_{i2,j2} \quad (3)$$

In the equation (3), i1 and i2 are variables that identify the targets on the world coordinate system, while j1 and j2 are variables that identify the targets on the sensor coordinate system. $l_{i1, i2}$ represents the length of a line segment connecting $P_{MAP}(i1)$ and $P_{MAP}(i2)$ on the world coordinate system, while $h_{j1, j2}$ represents the length of a line segment connecting $P_{Det}(j1)$ and $P_{Det}(j2)$ on the sensor coordinate system.

$S(l_{i1, i2}, h_{j1, j2})$ represents the similarity between the line segment length $l_{i1, i2}$ and the line segment length $h_{j1, j2}$, and becomes a greater value as the line segment length and the line segment length $h_{j1, j2}$ are closer values. For the similarity $S(l_{i1, i2}, h_{j1, j2})$, the following equation (4) that uses the difference $d(l_{i1, i2}, h_{j1, j2})$ between the line segment length $l_{i1, i2}$ and the line segment length $h_{j1, j2}$ can be employed, for example.

[Math. 4]

$$S(l_{i1,i2}, h_{j1,j2}) = 2^{-|d(l_{i1,i2}, h_{j1,j2})|} \quad (4)$$

Figure 12:
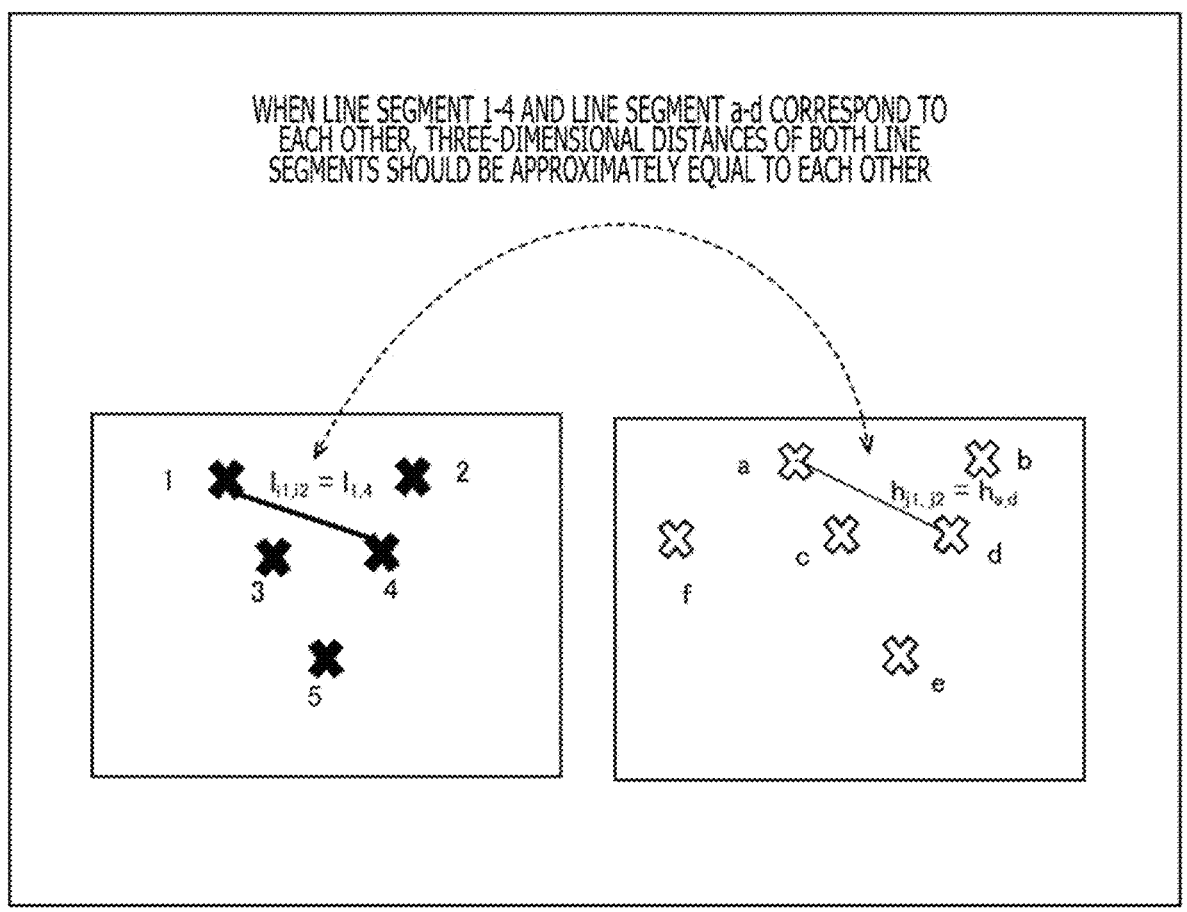
FIG. 12 is a diagram for describing the first correspondence detection process.

The score function score (X) calculated as described above is based on the idea that, for example, when the line segment between the targets 1 and 4 on the world coordinate system and the line segment between the targets a and d on the sensor coordinate system correspond to each other, the lengths of both line segments, that is, $l_{1, 4}$ and $l_{a, d}$ are approximately equal to each other and the difference d $(l_{i1, i2}, h_{j1, j2}) = d (l_{1,4}, h_{a,d})$ becomes small, as illustrated in FIG. 12.

<Second Correspondence Detection Process>

The above-described first correspondence detection process is a detection method using the prior arrangement information of the targets, but it is also possible to detect the correspondence relationships between the targets detected on the radar three-dimensional coordinate system and the targets detected on the camera three-dimensional coordinate system without using the prior arrangement information of the targets.

Figure 13:
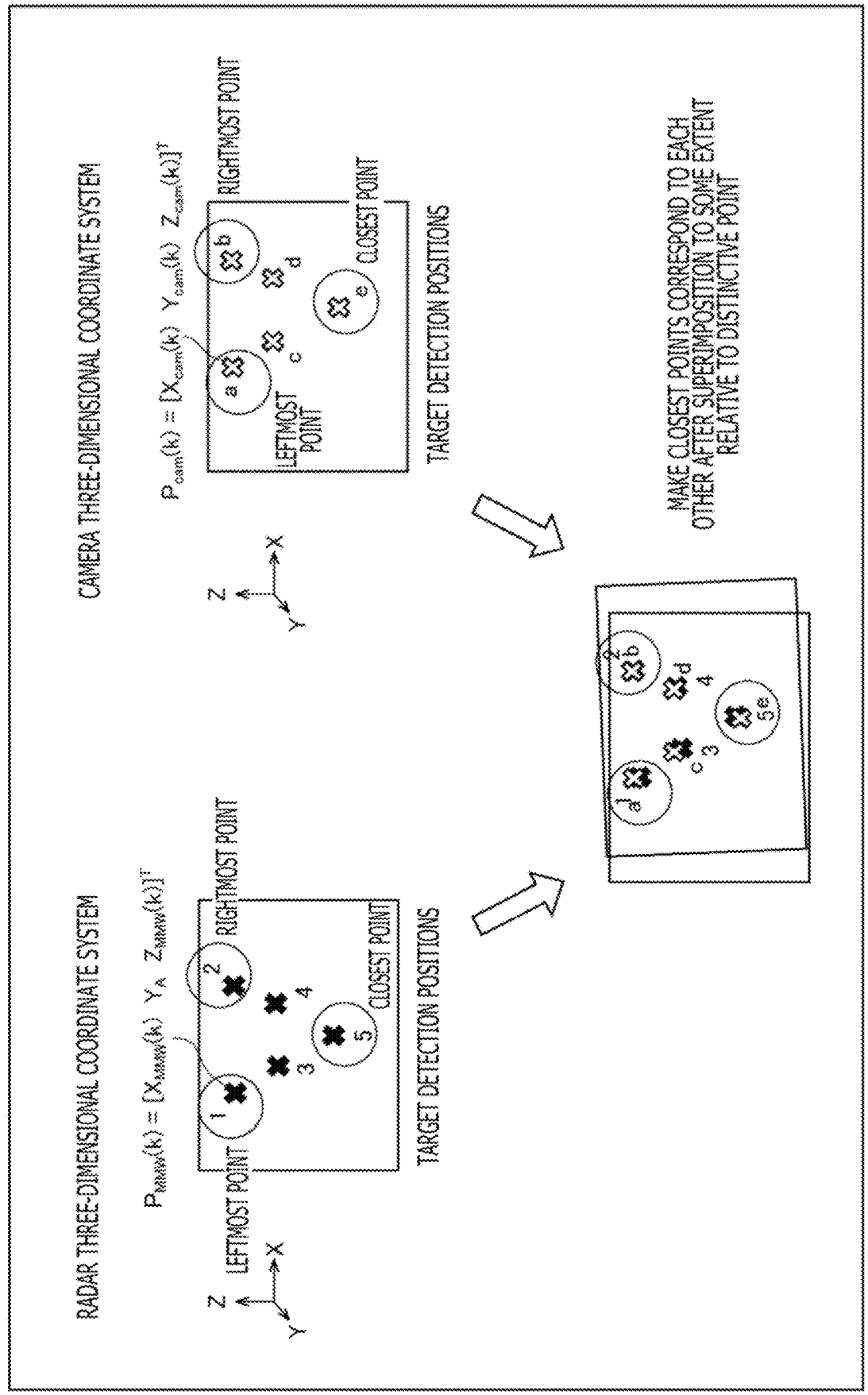
FIG. 13 is a diagram for describing a second correspondence detection process.

For example, as illustrated in FIG. 13, the correspondence detection unit 36 slides at least one of the target position $P_{MMW}(k)$ on the radar three-dimensional coordinate system and the target position $P_{cam}(k)$ on the camera three-dimensional coordinate system by a predetermined amount for superimposition, so that the targets arranged closest to each other can correspond to each other.

<3. Calibration Process During Operation>

Next, the calibration process during operation will be described.

Figure 14:
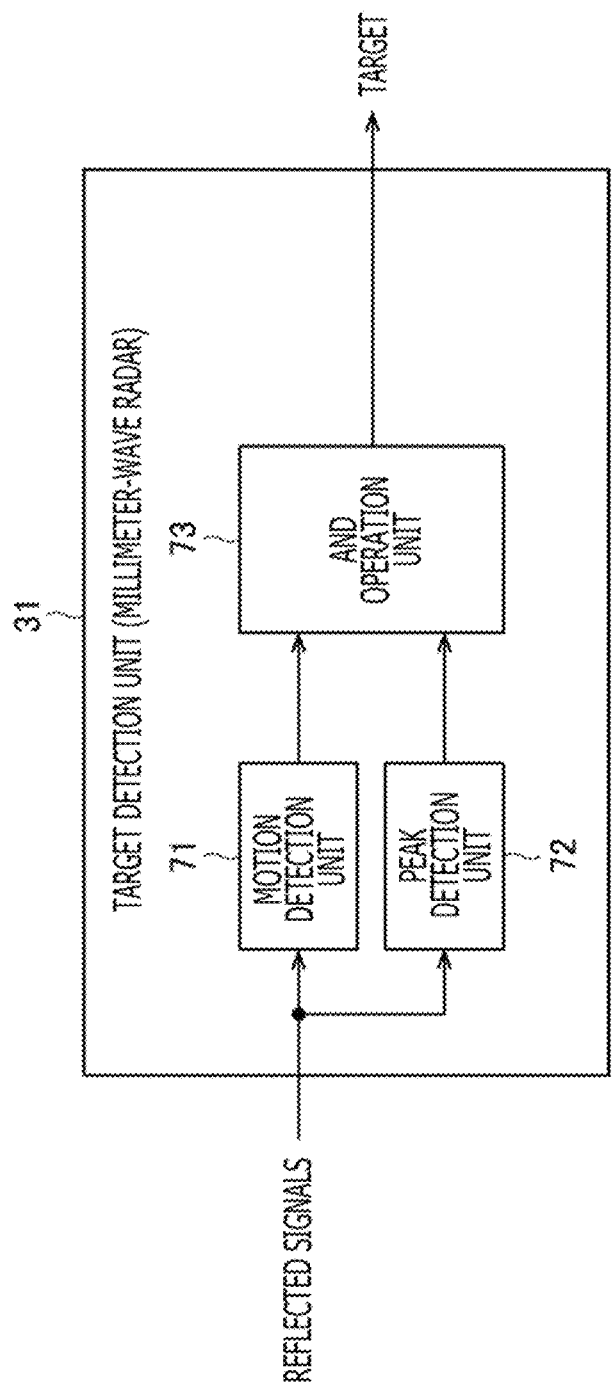
FIG. 14 is a block diagram illustrating a detailed exemplary configuration of the target detection unit in which a calibration process during operation is executed.

FIG. 14 is a block diagram illustrating a detailed exemplary configuration of the target detection unit 31 on the millimeter-wave radar 11 side where the calibration process during operation is executed.

The target detection unit 31 includes a motion detection unit 71, a peak detection unit 72, and an AND operation unit 73.

The motion detection unit 71 includes a storage unit that stores a reflected signal of at least one previous frame. The motion detection unit 71 detects the motion of a peak position by comparing reflected signals of the current frame supplied from the millimeter-wave radar 11 with reflected signals of the previous frame inputted immediately before. The motion detection unit 71 supplies the peak position whose motion is detected to the AND operation unit 73.

The peak detection unit 72 detects a peak position whose reflected signal intensity is equal to or higher than a predetermined intensity among the reflected signals of the current frame supplied from the millimeter-wave radar 11 and supplies the detection result to the AND operation unit 73.

The AND operation unit 73 performs an AND operation on the peak position supplied from the motion detection unit 71 and the peak position supplied from the peak detection unit 72. In other words, of the peak position supplied from the peak detection unit 72, the AND operation unit 73 extracts the peak position supplied from the motion detection unit 71, that is, only the peak position whose motion is detected, and supplies the extraction result to the three-dimensional position calculating unit 32 as the target detection position.

Figure 15:
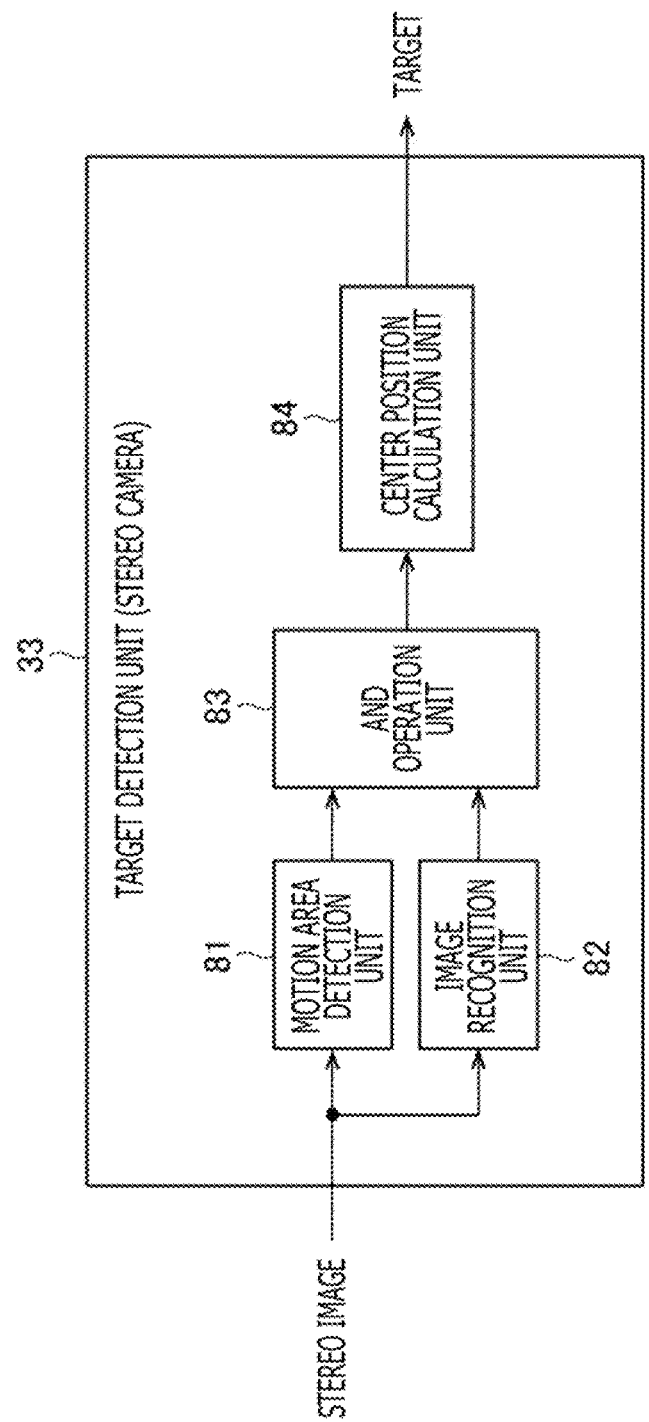
FIG. 15 is a block diagram illustrating a detailed exemplary configuration of the target detection unit in which the calibration process during operation is executed.

FIG. 15 is a block diagram illustrating a detailed exemplary configuration of the target detection unit 33 on the stereo camera 12 side where the calibration process during operation is executed.

The target detection unit 33 includes a motion area detection unit 81, an image recognition unit 82, an AND operation unit 83, and a center position calculation unit 84.

The motion area detection unit 81 includes a storage unit that stores a stereo image of at least one previous frame. The motion area detection unit 81 detects a motion area in the stereo image by comparing the stereo image of the current frame supplied from the stereo camera 12 with the stereo image of the previous frame inputted immediately before. The motion area in the stereo image can be detected by using motion vector estimation, frame difference or the like. The motion area detection unit 81 supplies the detected motion area to the AND operation unit 83.

The image recognition unit 82 detects a target area by performing image recognition on the stereo image of the current frame supplied from the stereo camera 12. For example, in the case of detecting a pedestrian (human) as a target, the target area can be detected by performing the image recognition process for recognizing the shape of the human (silhouette) or the face thereof. The image recognition unit 82 supplies the detected target area to the AND operation unit 83.

The AND operation unit 83 performs an AND operation on the motion area supplied from the motion area detection unit 81 and the target area supplied from the image recognition unit 82. In other words, of the motion area supplied from the motion area detection unit 81, the AND operation unit 83 extracts the target area supplied from the image recognition unit 82, that is, only the target area whose motion is detected, and supplies the extraction result to the center position calculation unit 84.

The center position calculation unit 84 calculates a pixel position serving as the center of the target area supplied from the AND operation unit 83, and supplies the calculated pixel position to the three-dimensional position calculating unit 32 as the target detection position.

<Specific Example of Calibration Process during Operation>

The calibration process during operation will be specifically described with reference to FIGS. 16 to 21.

Figure 16:
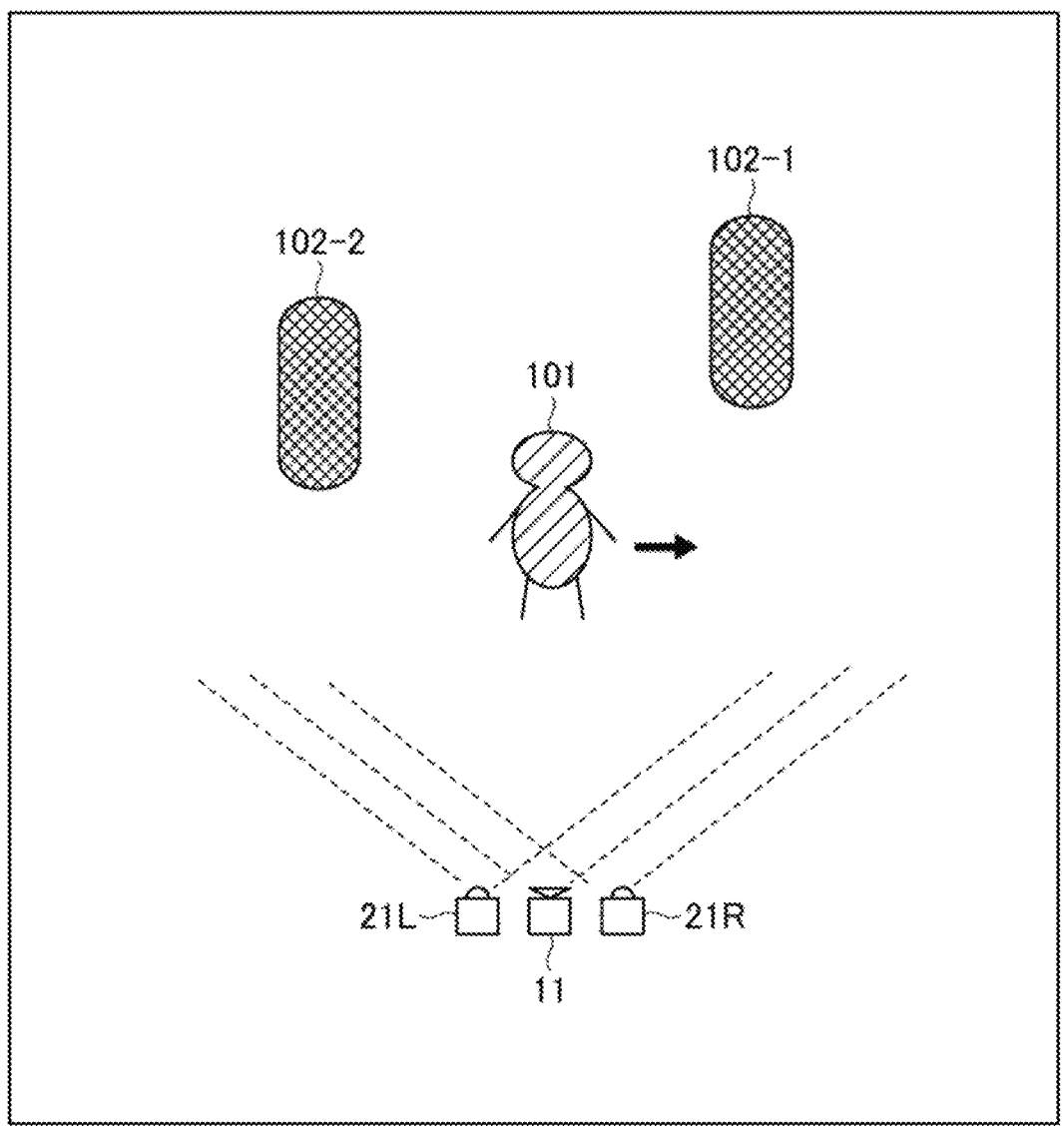
FIG. 16 is a diagram for specifically describing the calibration process during operation.

A description will be given of an example where while, for example, a vehicle mounting the object detection system 1 is stopped, the object detection system 1 detects a pedestrian 101 in front illustrated in FIG. 16 as a target and executes the calibration process during operation.

The detection range of the millimeter-wave radar 11 and the stereo camera 12 includes the pedestrian 101 and two fixed objects 102-1 and 102-2. The pedestrian 101 is in the middle of moving in the right direction in the figure, and the fixed objects 102-1 and 102-2 are objects that do not move.

Figure 17:
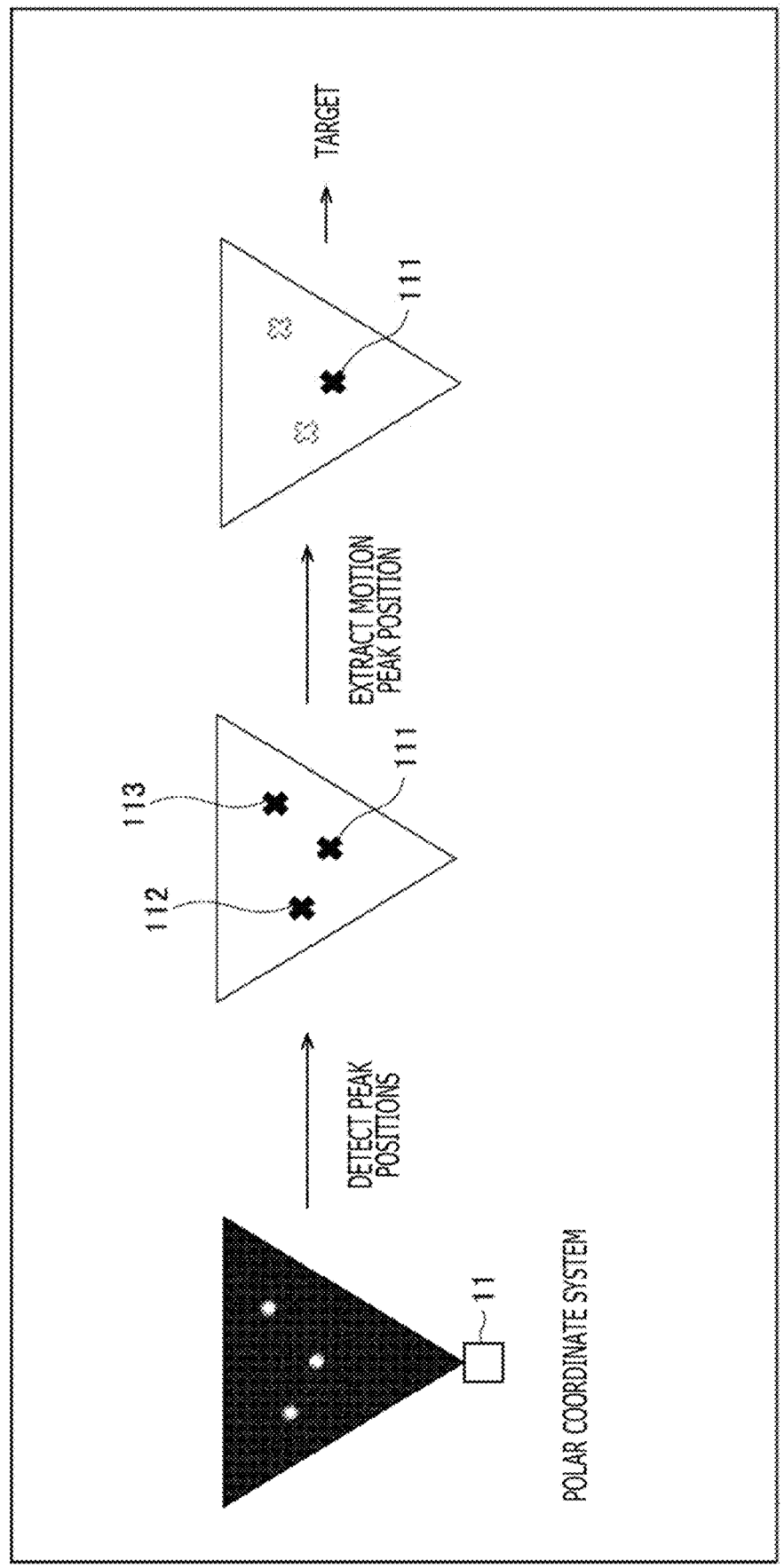
FIG. 17 is a diagram for specifically describing the calibration process during operation.

In the target detection unit 31 on the millimeter-wave radar 11 side, the peak detection unit 72 detects peak positions 111 to 113 from reflected signals of the current frame supplied from the millimeter-wave radar 11 as illustrated in FIG. 17, and supplies the detection result to the AND operation unit 73. The peak position 111 corresponds to the pedestrian 101 in FIG. 16, and the peak positions 112 and 113 correspond to the fixed objects 102-1 and 102-2, respectively.

Meanwhile, the motion detection unit 71 compares the reflected signals of the current frame with reflected signals of the previous frame inputted immediately before, and supplies only the peak position 111 to the AND operation unit 73 as the peak position whose motion is detected.

Of the peak positions 111 to 113 supplied from the peak detection unit 72, the AND operation unit 73 supplies only the peak position 111 supplied from the motion detection unit 71 to the three-dimensional position calculating unit 32 as the target detection position.

Figure 18:
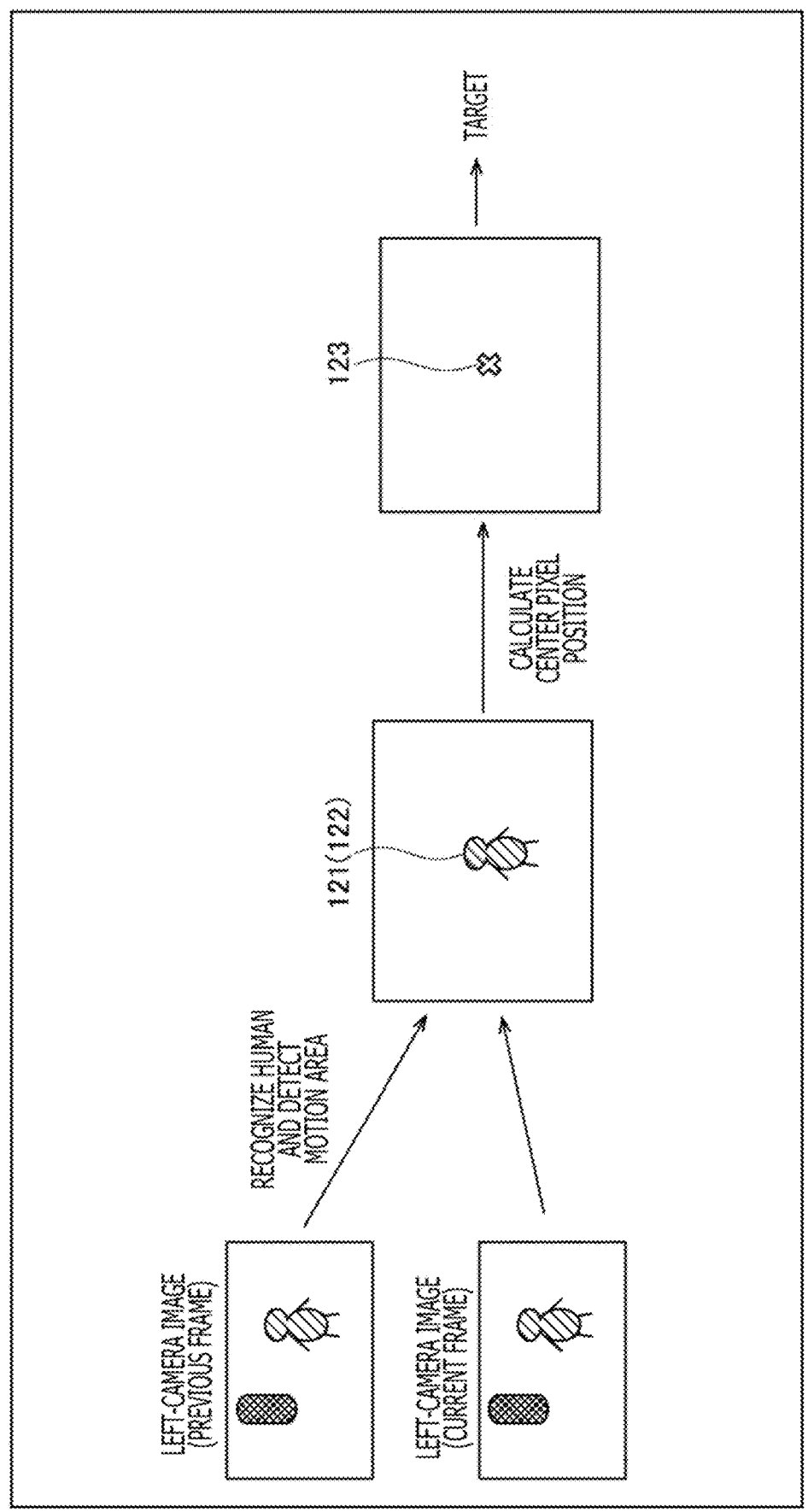
FIG. 18 is a diagram for specifically describing the calibration process during operation.

Meanwhile, in the target detection unit 33 on the stereo camera 12 side, the image recognition unit 82 detects a target area 121 by performing the image recognition process for recognizing the human shape and face on a stereo image of the current frame as illustrated in FIG. 18. The target area 121 corresponds to the pedestrian 101 in FIG. 16.

The motion area detection unit 81 detects a motion area 122 in the stereo image by comparing the stereo image of the current frame supplied from the stereo camera 12 with a stereo image of the previous frame inputted immediately before. The motion area 122 detected here also corresponds to the pedestrian 101 in FIG. 16.

Note that the stereo image on which the target detection unit 33 performs the image recognition process and the stereo image from which the motion area detection unit 81 detects the motion area use the same left-camera image as the disparity image.

The AND operation unit 83 performs an AND operation on the motion area 122 supplied from the motion area detection unit 81 and the target area 121 supplied from the image recognition unit 82, and supplies the resultant target area 121 to the center position calculation unit 84.

The center position calculation unit 84 calculates a center pixel position 123 of the target area 121 supplied from the AND operation unit 83, and supplies the calculated center pixel position 123 to the three-dimensional position calculating unit 32 as the target detection position.

Figure 19:
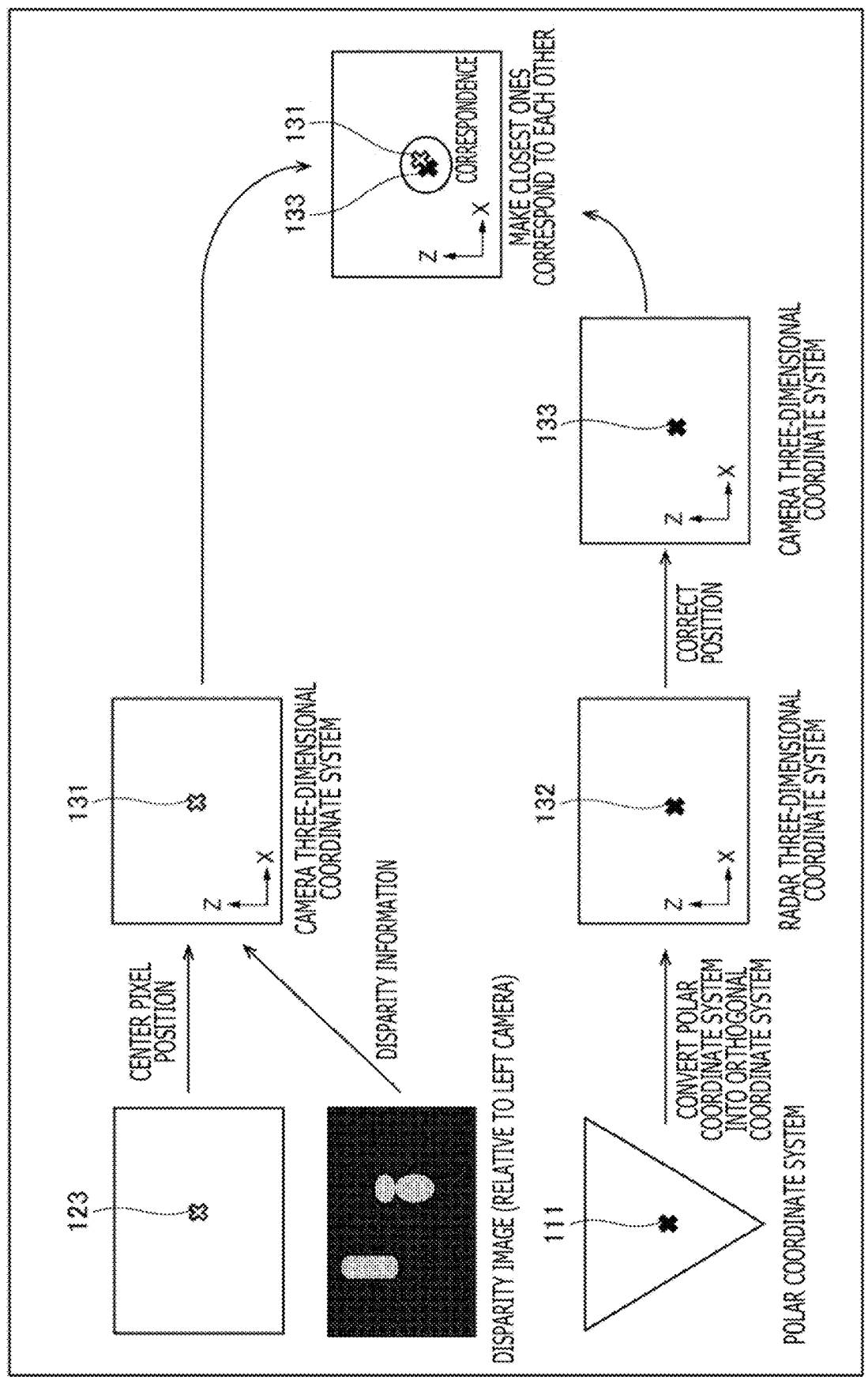
FIG. 19 is a diagram for specifically describing the calibration process during operation.

Next, as illustrated in FIG. 19, the three-dimensional position calculating unit 35 on the stereo camera 12 side calculates a target detection position 131 on the camera three-dimensional coordinate system from the disparity information relative to the left-camera image supplied from the disparity estimation unit 34 and the target detection position 123 supplied from the center position calculation unit 84 of the target detection unit 33, and supplies the target detection position 131 to the correspondence detection unit 36. In the camera three-dimensional coordinate system, the forward direction of the vehicle is the Z-axis, the lateral direction is the X-axis, and the longitudinal direction is the Y-axis.

Meanwhile, the three-dimensional position calculating unit 32 on the millimeter-wave radar 11 side converts the target detection position 111 represented by the polar coordinate system and supplied from the target detection unit 31 into a target detection position 132 on the radar three-dimensional coordinate system, and supplies the target detection position 132 to the correspondence detection unit 36. In the radar three-dimensional coordinate system, the forward direction of the vehicle is the Z-axis, the lateral direction is the X-axis, and the longitudinal direction is the Y-axis.

The correspondence detection unit 36 obtains positional relationship information of the millimeter-wave radar 11 and the stereo camera 12, specifically, the rotation matrix R and the translation vector V of the equation (1) that have been calculated by the pre-shipment calibration process and stored in the storage unit 38.

Then, the correspondence detection unit 36 calculates a target detection position 133 corrected from the target detection position 132 on the radar three-dimensional coordinate system supplied from the three-dimensional position calculating unit 32 into the position on the camera three-dimensional coordinate system by using the positional relationship information of the millimeter-wave radar 11 and the stereo camera 12 at the present time, as illustrated in FIG. 19.

Subsequently, the correspondence detection unit 36 detects a correspondence relationship between the target detected on the stereo camera 12 side and the target detected on the millimeter-wave radar 11 side by comparing the target detection position 131 on the camera three-dimensional coordinate system supplied from the three-dimensional position calculating unit 35 on the stereo camera 12 side with the target detection position 133 on the millimeter-wave radar 11 side corrected into the camera three-dimensional coordinate system.

The correspondence detection unit 36 recognizes that the targets whose coordinate positions are closest to each other are the targets that correspond to each other. Although the number of detected targets is one in the example in FIG. 19, even when a plurality of targets is detected, it is possible to detect correspondence relationships easily because the position-corrected detection positions are compared using the positional relationship information calculated by the pre-shipment calibration process.

Figure 20:
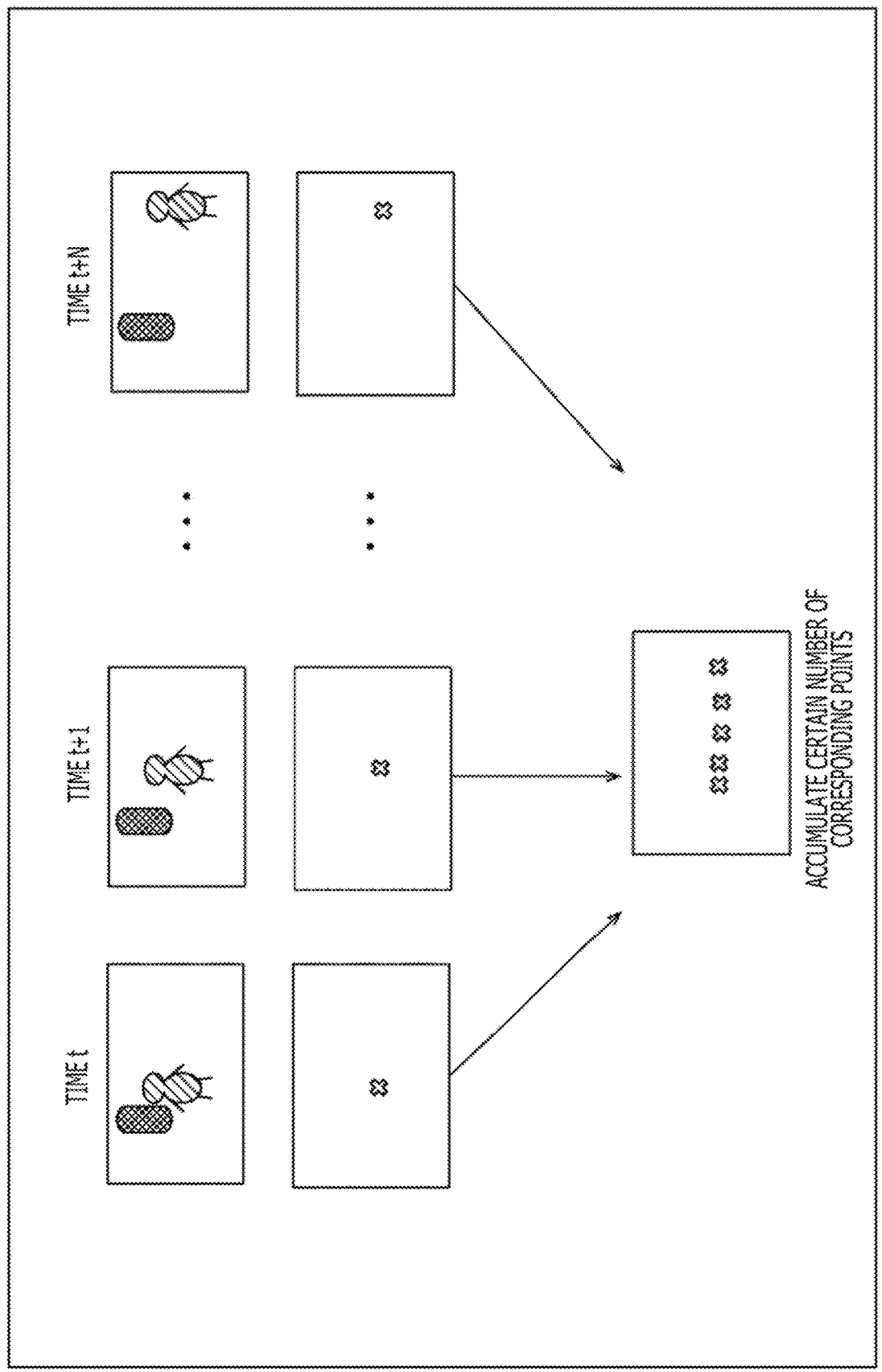
FIG. 20 is a diagram for specifically describing the calibration process during operation.

When the process described with reference to FIGS. 17 to 19 is the process at time t, for example, the signal processing apparatus 13 executes the process with a plurality of frames (N frames), as illustrated in FIG. 20. With this configuration, where a corresponding point detected in each frame is one point, the corresponding points of N points at different detection positions are detected in the N frames and accumulated in the storage unit 38.

As described above, at least six target detection positions are necessary to calculate the rotation matrix R and the translation vector V of the equation (1). These six target detection positions may be obtained from a total of six frames each including one point or may be obtained from a total of three frames each including two points, for example. Note that a greater number of corresponding points for solving the equation (1) is desirable to improve the calibration precision. Therefore, the number of frames N is 6 or greater and desirably of a greater value.

In the calibration process during operation, furthermore, time t to t+N of the N frames for solving the equation (1), which are illustrated in FIG. 20, are not necessarily temporally continuous. For example, it is also possible to execute the calibration process during operation described above using corresponding points detected in 10 frames in one day that satisfies a predetermined condition and corresponding points detected in 20 frames in another day that satisfies the predetermined condition.

Further, the signal processing apparatus 13 can select a frame to be used for the calibration process during operation to improve the calibration precision.

Specifically, the signal processing apparatus 13 selects a frame in which another target detection position does not exist within a predetermined range (distance) of a detected target detection position as a frame to be used for the calibration process during operation and accumulates the frame in the storage unit 38.

Figure 21:
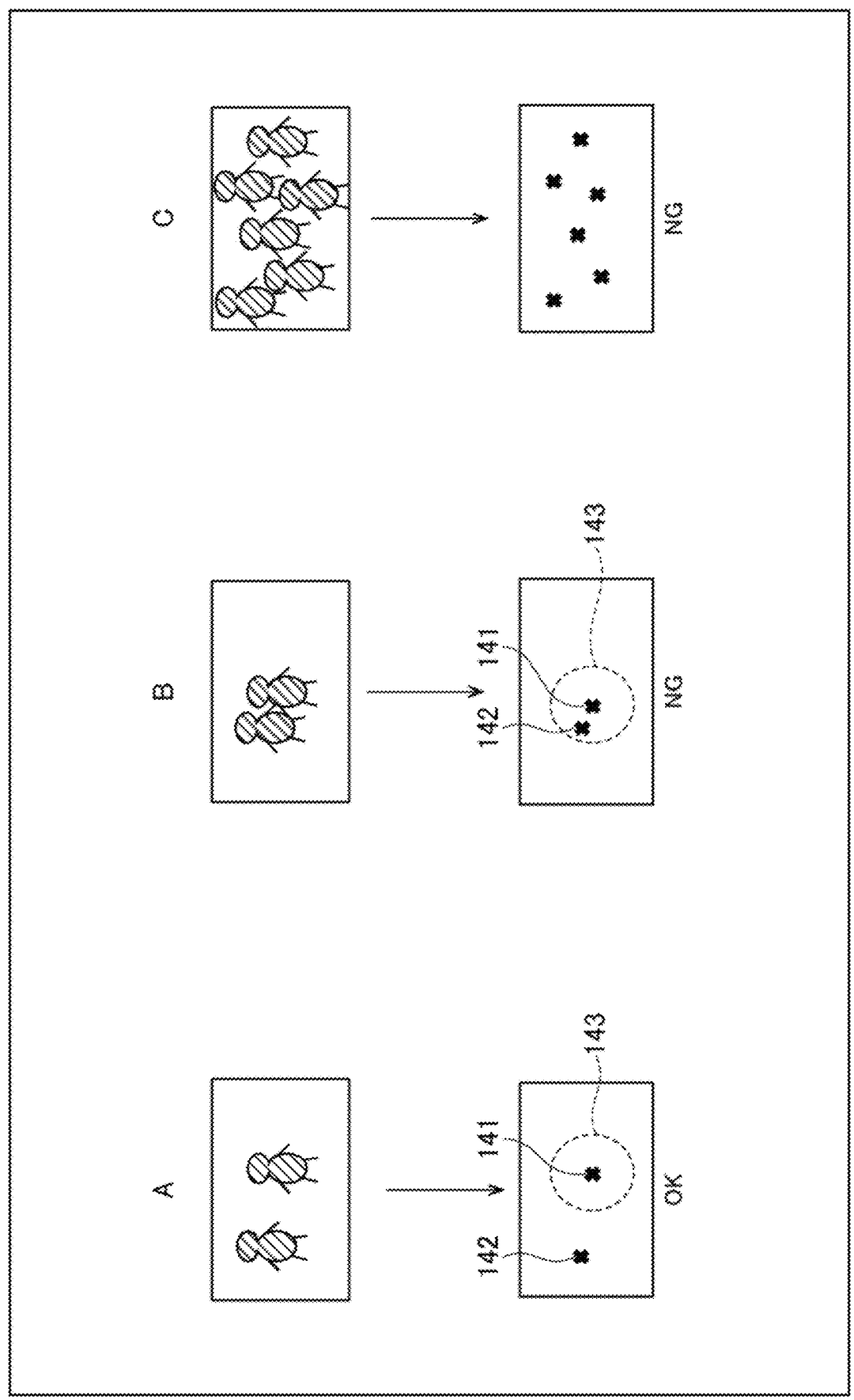
FIG. 21 is a diagram for specifically describing the calibration process during operation.

For example, target detection positions 141 and 142 are detected in a frame A in FIG. 21. Outside a predetermined range 143 of the target detection position 141, another target detection position 142 exists. In such a case, the frame A in FIG. 21 is selected as a frame to be used for the calibration process during operation.

In a frame B in FIG. 21, by contrast, another target detection position 142 exists within the predetermined range 143 of the target detection position 141. In this case, the frame B in FIG. 21 is excluded from a frame to be used for the calibration process during operation.

Further, where a predetermined number or more of targets are detected in one frame as in a frame C in FIG. 21, the signal processing apparatus 13 also excludes the frame from the frame to be used for the calibration process during operation.

In this way, unlike the pre-shipment calibration process, since a target prepared in advance is not used in the calibration process during operation, a frame (target) in which a corresponding point is detected and with which higher precision can be obtained is selected, and the positional relationship information of the millimeter-wave radar 11 and the stereo camera 12 is recalculated. Note that the frame selection may be performed by the target detection unit 31 or 33, or may be performed by the correspondence detection unit 36.

<4. Process Flow of Calibration Process>

Figure 22:
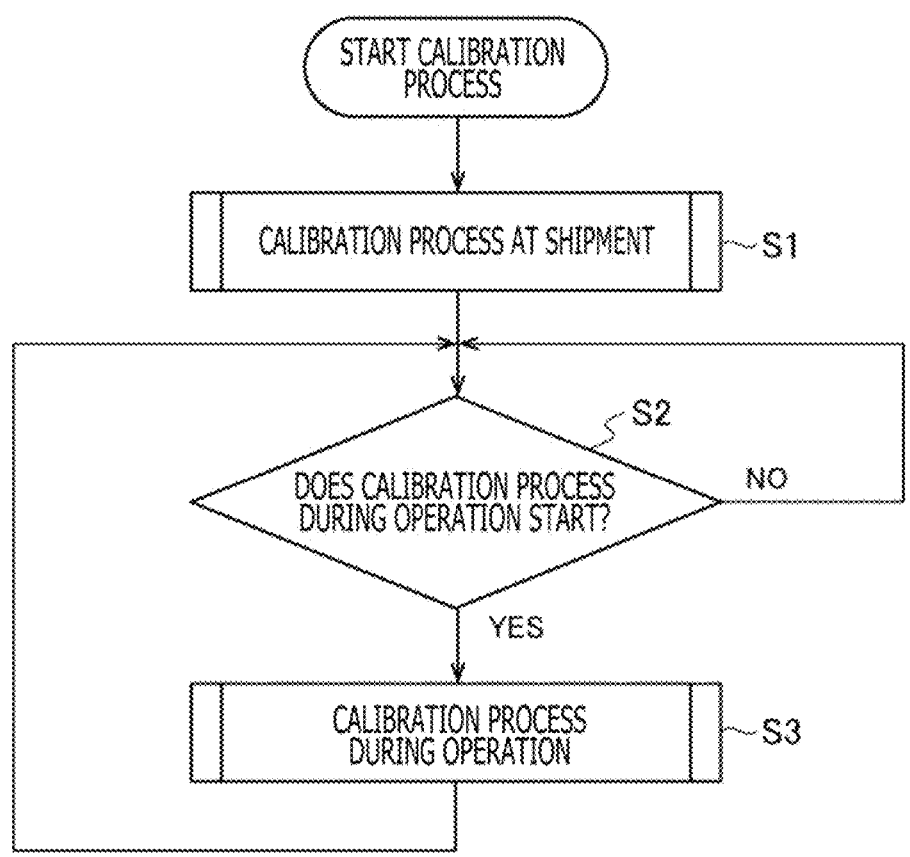
FIG. 22 is a flowchart for describing a calibration process.

Next, the calibration process executed by the signal processing apparatus 13 will be described with reference to the flowchart in FIG. 22.

First, the signal processing apparatus 13 executes the calibration process at shipment in step S1. Although the details of this process will be described later with reference to the flowchart in FIG. 23, the rotation matrix R and the translation vector V of the equation (1), which serve as the positional relationship information of the millimeter-wave radar 11 and the stereo camera 12, are calculated and stored in the storage unit 38 through this process.

The calibration process at shipment in step S1 is executed where a user (operator) issues instructions to start the calibration through an operation panel or the like in a factory that manufactures the vehicle mounting the object detection system 1, or a sales outlet such as a dealer, for example. Alternatively, the calibration process at shipment may also be automatically executed where (it is detected that) the vehicle is stopped at a place which is an environment adequate for the calibration. After the calibration process at shipment ends, the vehicle is shipped and delivered to an owner (driver).

In step S2, the signal processing apparatus 13 determines whether to start the calibration process during operation. For example, the signal processing apparatus 13 determines the start of the calibration process during operation when a predetermined start condition is satisfied, for example, when a certain period or longer has elapsed since the previous calibration process at shipment or calibration process during operation, the predetermined number or more of corresponding points are accumulated in the storage unit 38 as described in FIG. 20, or the amount of deviation of the position-corrected corresponding points of the millimeter-wave radar 11 and the stereo camera 12 becomes equal to or greater than a predetermined value at all times (equal to or greater than a predetermined number of times).

Further, the signal processing apparatus 13 determines not to start the calibration process during operation where the vehicle is not horizontal to the road surface (tilted), the vehicle is moving at high speed, or the number of targets detected at a time is equal to or greater than a predetermined value, or in case of the environment condition such as in bad weather, retrograde, darkness or the like where reliability of the stereo image captured by the stereo camera 12 is low, or the environment condition where the reliability of the millimeter-wave radar 11 is low since the vehicle is in a place (for example, a tunnel) where multiple reflection of the millimeter wave of the millimeter-wave radar 11 is likely to occur. Whether or not the vehicle is in a place where multiple reflection is likely to occur can be determined on the basis of, for example, a received GPS signal.

In step S2, in a case where it is determined that the calibration process during operation does not start, the process returns to step S2 and the process in step S2 is repeated until it is determined that the calibration process during operation starts.

On the other hand, in a case where it is determined in step S2 that the calibration process during operation stats, the process proceeds to step S3 and the signal processing apparatus 13 executes the calibration process during operation. Although the details of this process will be described later with reference to the flowchart in FIG. 24, the rotation matrix R and the translation vector V of the equation (1), which serve as the positional relationship information of the millimeter-wave radar 11 and the stereo camera 12, are recalculated and overwritten (updated) in the storage unit 38 through this process.

Figure 23:
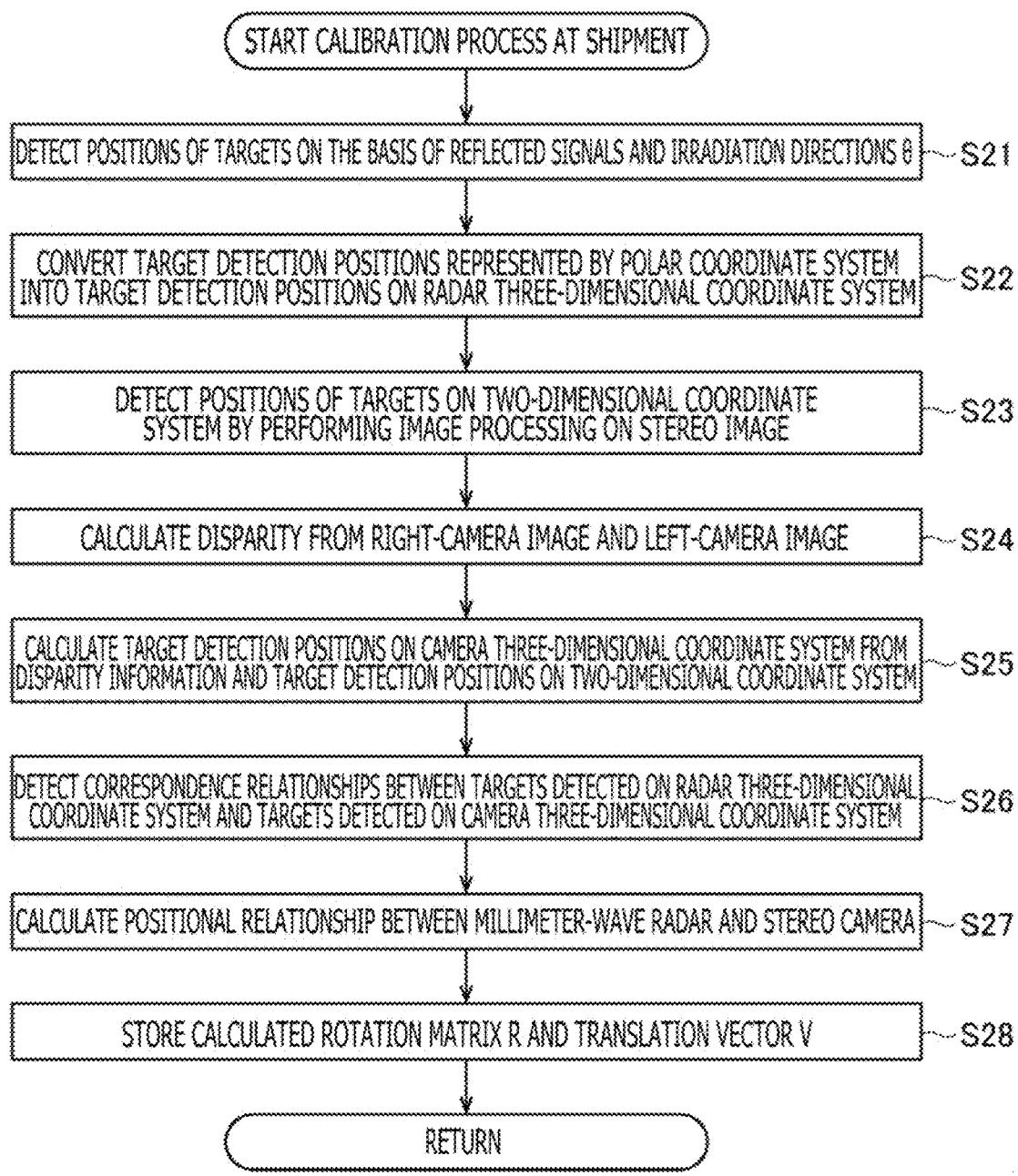
FIG. 23 is a flowchart for describing a calibration process at shipment in FIG. 22.

FIG. 23 is a flowchart for describing the detailed calibration process at shipment in step S1 described above.

In step S21, the target detection unit 31 on the millimeter-wave radar 11 side detects the positions of the targets in front of the vehicle on the basis of the reflected signals and the irradiation directions θ supplied from the millimeter-wave radar 11. The target detection positions detected by the target detection unit 31 are each represented by the polar coordinate system including the distance L based on the intensity of the reflected signal and the irradiation direction θ and supplied to the three-dimensional position calculating unit 32.

In step S22, the three-dimensional position calculating unit 32 on the millimeter-wave radar 11 side converts the target detection positions represented by the polar coordinate system and supplied from the target detection unit 31 into the target detection positions on the radar three-dimensional coordinate system.

In step S23, the target detection unit 33 on the stereo camera 12 side detects the positions of the targets on the two-dimensional coordinate system by performing image processing such as the pattern matching or feature detection process on the stereo image.

In step S24, the disparity estimation unit 34 calculates disparity from the right-camera image supplied from the right camera 21R and the left-camera image supplied from the left camera 21L and supplies the disparity to the three-dimensional position calculating unit 35 as disparity information.

In step S25, the three-dimensional position calculating unit 35 calculates the target detection positions on the camera three-dimensional coordinate system from the disparity information supplied from the disparity estimation unit 34 and the target detection positions on the two-dimensional coordinate system supplied from the target detection unit 33.

Note that the processes in steps S21 to S25 can be executed sequentially as described above, or alternatively, the processes in steps S21 and S22 can be executed in parallel with the processes in steps S23 to S25.

In step S26, the correspondence detection unit 36 detects correspondence relationships between the targets detected on the radar three-dimensional coordinate system and the targets detected on the camera three-dimensional coordinate system by executing the above-described first correspondence detection process. Specifically, the correspondence detection unit 36 identifies the targets by collating the target detection positions detected on the radar three-dimensional coordinate system with the target prior arrangement information. Further, the correspondence detection unit 36 identifies the targets by collating the target detection positions detected on the camera three-dimensional coordinate system with the target prior arrangement information. Then, the correspondence detection unit 36 detects which target detected on the camera three-dimensional coordinate system corresponds to the target detected on the radar three-dimensional coordinate system on the basis of the result of collation with the target prior arrangement information.

Note that in step S26, the above-described second correspondence detection process may be executed instead of the first correspondence detection process.

In step S27, the position and attitude estimation unit 37 calculates a positional relationship between the millimeter-wave radar 11 and the stereo camera 12 by substituting the target detection positions of the plurality of targets whose correspondence relationships are identified by the correspondence detection unit 36 into the equation (1) and solving the equation (1) using the method of least squares and the like. In this way, the rotation matrix R and the translation vector V of the equation (1) are calculated.

In step S28, the position and attitude estimation unit 37 stores the calculated rotation matrix R and translation vector V in the storage unit 38.

Now, the calibration process at shipment in step S1 ends.

Figure 24:
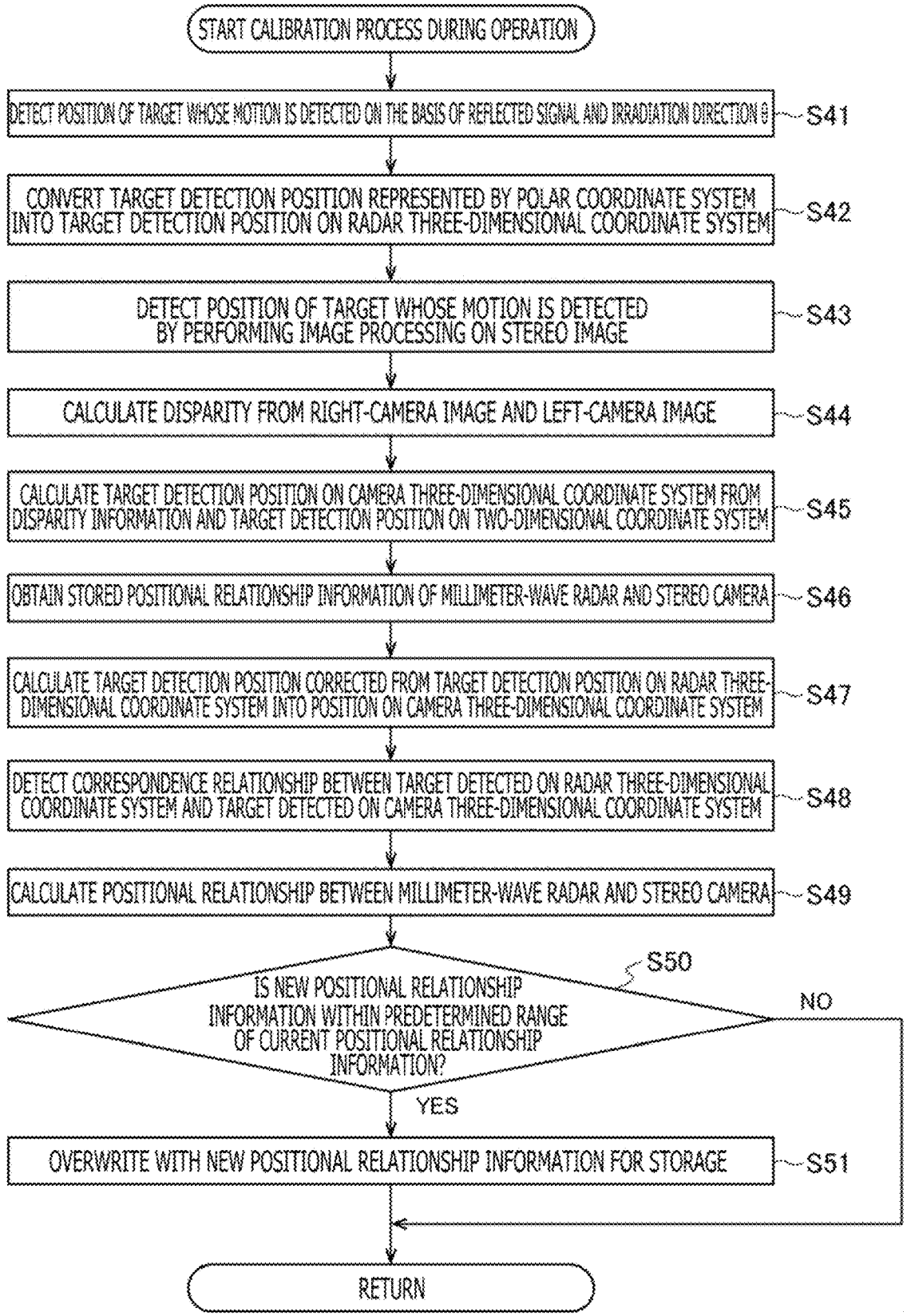
FIG. 24 is a flowchart for describing the calibration process during operation in FIG. 22.

Next, the details of the calibration process during operation in step S3 described above will be described with reference to the flowchart in FIG. 24.

In step S41, the target detection unit 31 on the millimeter-wave radar 11 side detects the position of the target whose motion is detected on the basis of the reflected signal and the irradiation direction θ supplied from the millimeter-wave radar 11.

More specifically, the motion detection unit 71 detects the motion of a peak position by comparing reflected signals of the current frame with reflected signals of the previous frame inputted immediately before. Further, the peak detection unit 72 detects a peak position from the reflected signals of the current frame and supplies the peak position to the AND operation unit 73. Then, of the peak position supplied from the peak detection unit 72, the AND operation unit 73 extracts only the peak position supplied from the motion detection unit 71 and supplies the extraction result to the three-dimensional position calculating unit 32 as the target detection position whose motion is detected.

In step S42, the three-dimensional position calculating unit 32 on the millimeter-wave radar 11 side converts the target detection position represented by the polar coordinate system and supplied from the target detection unit 31 into the target detection position on the radar three-dimensional coordinate system.

In step S43, the target detection unit 33 on the stereo camera 12 side detects the position of the target whose motion is detected by performing image processing such as the pattern matching or feature detection process on the stereo image.

More specifically, the motion area detection unit 81 detects a motion area in the stereo image by comparing the current stereo image with the stereo image of the previous frame inputted immediately before. The image recognition unit 82 detects a target area by performing image recognition on the current stereo image supplied from the stereo camera 12. Of the motion area supplied from the motion area detection unit 81, the AND operation unit 83 extracts the target area supplied from the image recognition unit 82 and supplies the extraction result to the center position calculation unit 84. The center position calculation unit 84 calculates a center pixel position of the target area supplied from the AND operation unit 83, and supplies the calculated center pixel position to the three-dimensional position calculating unit 32 as the target detection position whose motion is detected.

In step S44, the disparity estimation unit 34 calculates disparity from the right-camera image supplied from the right camera 21R and the left-camera image supplied from the left camera 21L and supplies the disparity to the three-dimensional position calculating unit 35 as disparity information.

In step S45, the three-dimensional position calculating unit 35 on the stereo camera 12 side calculates the target detection position on the camera three-dimensional coordinate system from the disparity information supplied from the disparity estimation unit 34 and the target detection position on the two-dimensional coordinate system supplied from the target detection unit 33.

In step S46, the correspondence detection unit 36 obtains the positional relationship information of the millimeter-wave radar 11 and the stereo camera 12 stored in the storage unit 38, specifically, the rotation matrix R and the translation vector V of the equation (1). Here, in the calibration process during operation performed for the first time, the positional relationship information obtained from the storage unit 38 is the data calculated in the pre-shipment calibration process. In the second and following calibration processes during operation, the positional relationship information is the data updated in the previous calibration process during operation.

In step S47, the correspondence detection unit 36 calculates the target detection position corrected from the target detection position 132 on the radar three-dimensional coordinate system supplied from the three-dimensional position calculating unit 32 into the position on the camera three-dimensional coordinate system using the obtained positional relationship information.

In step S48, the correspondence detection unit 36 detects a correspondence relationship between the target detected on the stereo camera 12 side and the target detected on the millimeter-wave radar 11 side by comparing the target detection position on the camera three-dimensional coordinate system supplied from the three-dimensional position calculating unit 35 on the stereo camera 12 side with the target detection position on the millimeter-wave radar 11 side corrected into the camera three-dimensional coordinate system.

In step S49, the position and attitude estimation unit 37 calculates a positional relationship between the millimeter-wave radar 11 and the stereo camera 12 by substituting a plurality of target detection positions of the target whose correspondence relationships are identified through the process in step S48 into the equation (1) and solving the equation (1).

In step S50, the position and attitude estimation unit 37 determines whether the new positional relationship information is within a predetermined range of the current positional relationship information by comparing the current positional relationship information stored in the storage unit 38 with the positional relationship information newly calculated in step S49.

In step S50, where it is determined that the new positional relationship information is within the predetermined range of the current positional relationship information, the process proceeds to step S51. The position and attitude estimation unit 37 overwrites the current positional relationship information stored in the storage unit 38 with the new positional relationship information for storage, and the calibration process during operation ends.

On the other hand, where it is determined in step S50 that the new positional relationship information is not within the predetermined range of the current positional relationship information, the process in step S51 is skipped and the calibration process during operation ends.

In the process in step S50, where the newly calculated positional relationship information is a significantly different value in comparison with the positional relationship information up to the present, the position and attitude estimation unit 37 determines that the calculated positional relationship information is of values with low reliability including some error factor, and therefore does not update the positional relationship information. Note that the process in step S50 may be omitted and the information stored in the storage unit 38 may be updated with the newly calculated positional relationship information all the time.

The calibration process at shipment and the calibration process during operation are executed as above.

Note that although the above-described calibration process at shipment and calibration process during operation are the examples of performing the process for calculating calibration data indicating a positional relationship between the millimeter-wave radar 11 and the stereo camera 12 just one time, the process may be performed multiple times and the average value thereof may be stored in the storage unit 38 as the final calibration data. Further, in the case of using pieces of calibration data calculated multiple times, it is possible to calculate the final calibration data after excluding data largely deviated from the other pieces of calibration data among the pieces of calibration data calculated multiple times.

<5. Examples of Targets in Calibration Process at Shipment>

Figure 25:
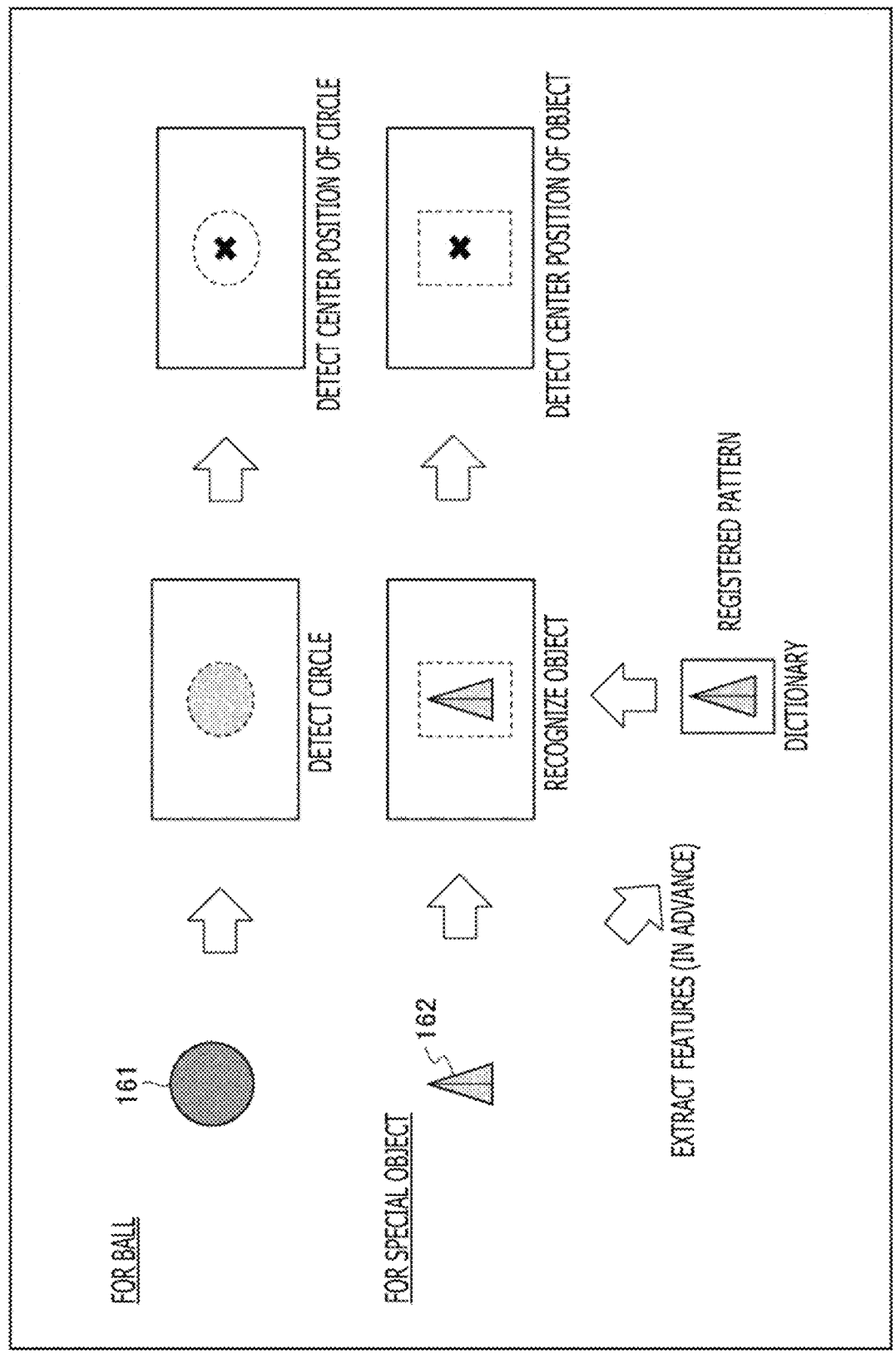
FIG. 25 is a diagram illustrating other examples of the targets.

FIG. 25 illustrates other examples of the targets that can be used in the calibration process at shipment.

In the calibration process at shipment, a ball 161 or a corner reflector 162 that reflects a millimeter wave can be used as a target, as illustrated in FIG. 25, for example.

To increase the calibration precision, it is desirable that the target detection unit 33, which detects the position of the target on the basis of the stereo image, detect the position of the target at the pixel level. In the example of the target 51 illustrated in FIG. 2, the intersection point 52 of the texture is calculated. In a case where the target is the ball 161, it is possible to detect the ball 161 in the stereo image as a circle by pattern matching, shape recognition for a circular shape or the like, and output the center position of the detected ball 161 as the target detection position.

Further, where the target is the corner reflector 162, it is possible to detect the corner reflector 162 in the stereo image by performing pattern matching using a registered pattern for the corner reflector 162, which is preliminarily registered, and output the center position of the registered pattern for the detected corner reflector 162 as the target detection position.

Figure 26:
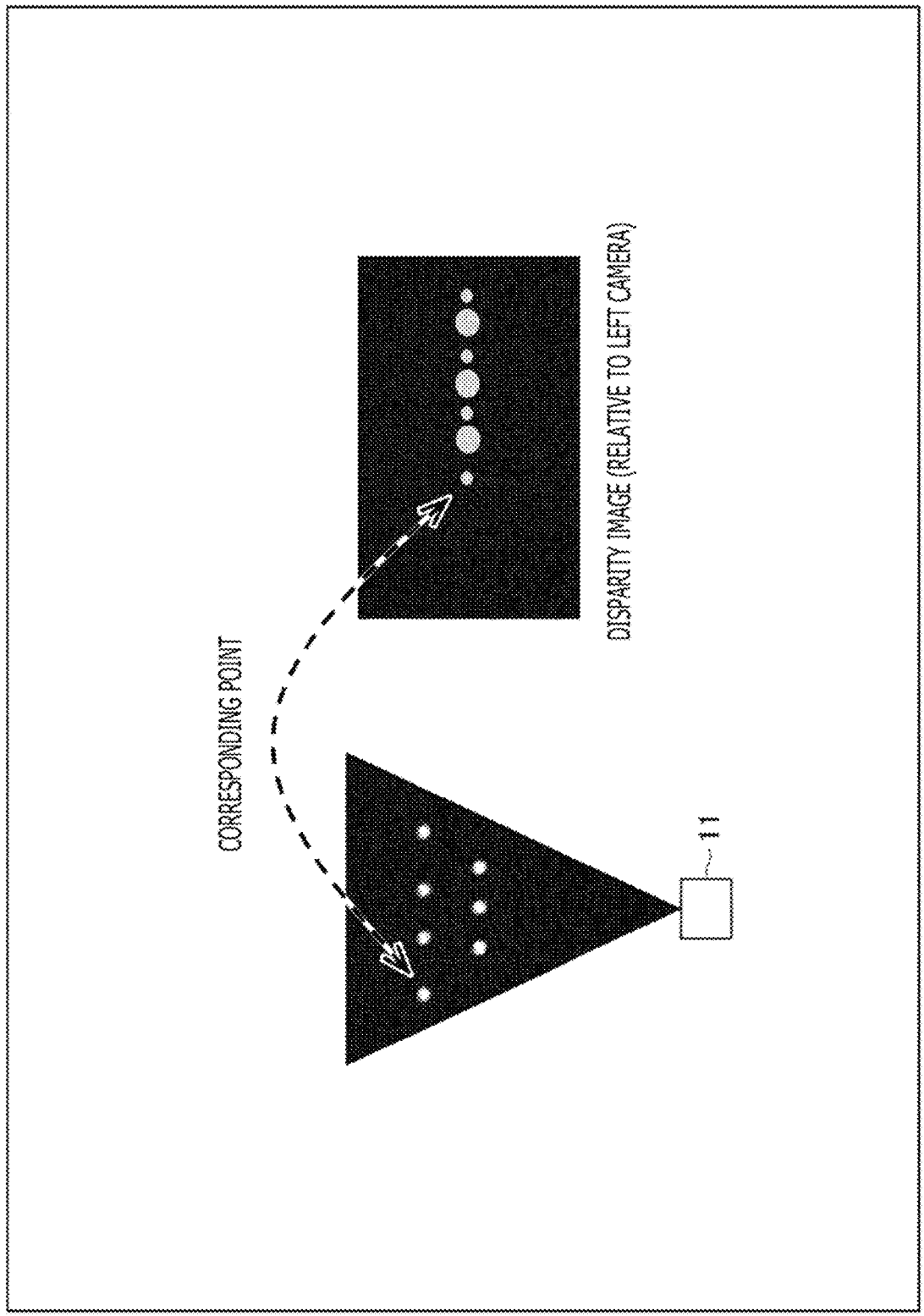
FIG. 26 is a diagram illustrating an example where the targets are balls.

FIG. 26 illustrates examples of the reflected signals of the millimeter-wave radar 11 as well as the disparity image that the stereo camera 12 calculates from the stereo image where the targets are balls 161.

<6. Examples of Targets in Calibration Process During Operation>

Next, other examples of the targets that can be used in the calibration process during operation will be described.

Examples of the targets that can be used in the calibration process during operation include a general object existing in a traffic environment such as, for example, a part of another vehicle (for example, a license plate), a part of the own vehicle, an advertising display, a sign, a traffic light, or a utility pole, in addition to a pedestrian (human) described above.

A method of detecting a target position where the target is a pole-like object such as a utility pole will be described with reference to FIG. 27.

First, the target detection unit 33 detects vertical parallel lines from a stereo image and calculates an area surrounded by the detected parallel lines as a pole area. In the example of FIG. 27, one pole area is detected in the stereo image, but there are also cases where a plurality of pole areas is detected.

Then, the target detection unit 33 individually performs pole determination on the detected pole area in the horizontal direction and the vertical direction on the basis of the disparity information of the stereo image calculated by the disparity estimation unit 34.

Figure 27:
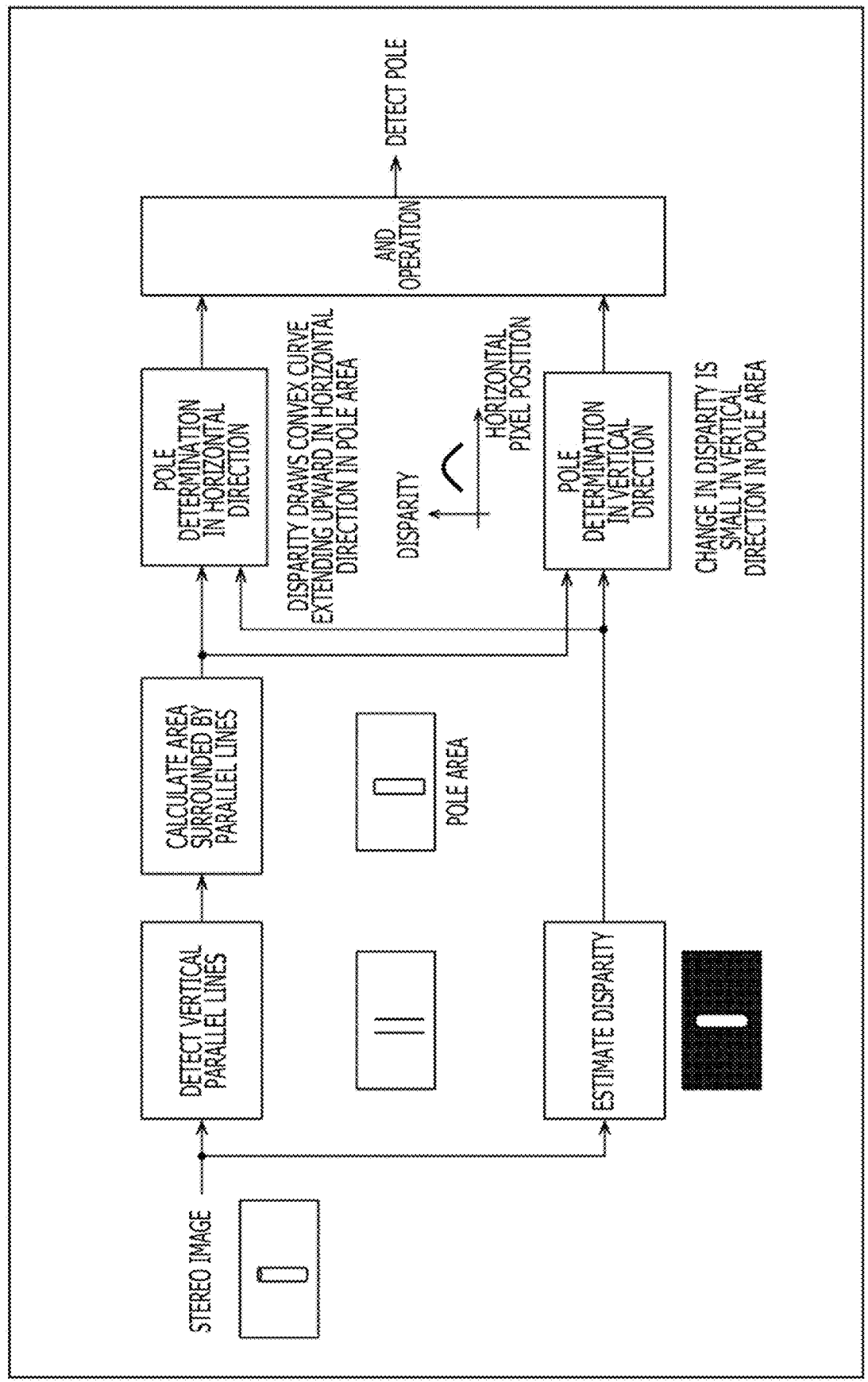
FIG. 27 is a diagram for describing a method of detecting a target position where the target is a pole-like object.

Specifically, as illustrated in FIG. 27, when the disparity viewed in the horizontal direction transitions in the pole area such that the disparity draws a convex curve extending upward, the target detection unit 33 determines that the pole determination result in the horizontal direction is true for the pole area, and when not, false.

Further, when the change in the disparity viewed in the vertical direction is small (equal to or less than a predetermined value), the target detection unit 33 determines that the pole determination result in the vertical direction is true for that pole area, and when not, false.

Lastly, the target detection unit 33 performs an AND operation on the pole determination result in the horizontal direction and the pole determination result in the vertical direction. That is, when both determination results, that is, the pole determination result in the horizontal direction and the pole determination result in the vertical direction are true, the target detection unit 33 outputs the position of the pole area as the target detection position.

As described above, when the target is a pole-like object such as a utility pole or the like, the target detection unit 33 can detect the target by also using the disparity information calculated by the disparity estimation unit 34 and output the target detection position.

The object detection system 1 described above can detect and calibrate the positional relationship information of the millimeter-wave radar 11 and the stereo camera 12 at the pixel-level precision of the stereo image, thereby achieving calibration with high precision.

Further, since the calibration during operation is executed using a general object existing in a traffic environment such as a pole-like object including a sign, a utility pole or the like, or a pedestrian, correction can be made (automatically) at any time even when the positional relationship between the millimeter-wave radar 11 and the stereo camera 12 changes due to factors such as aging variation, vibration, and heat.

Although a description has been given of the example where the object detection system 1 is mounted in a vehicle in the above-described example, the present technology can also be mounted in other moving objects that move on the land such as, for example, robots, in addition to vehicles.

Further, in the above-described example, the millimeter-wave radar 11 is employed as a first sensor for calculating the three-dimensional position of a target on the first coordinate system, and the stereo camera 12 is employed as a second sensor for calculating the three-dimensional position of a target on the second coordinate system. As the first sensor, in addition to the millimeter-wave radar 11, another radar-type sensor such as a radar using ultrasonic waves, a laser radar such as infrared rays, or a lidar may be employed. In other words, the first sensor may be any sensor as long as the sensor can obtain the position information of at least one of the lateral direction (horizontal direction) and longitudinal direction (vertical direction) and the position information of the depth direction.

<7. Exemplary Computer Configuration>

The series of processes including the above-described calibration process can be executed by hardware or software. In a case where the series of processes are to be executed by software, a program constituting the software is installed in a computer. Here, examples of the computer include a computer incorporated into dedicated hardware and a general-purpose personal computer capable of executing various kinds of functions with various kinds of programs installed therein.

FIG. 28 is a block diagram illustrating an exemplary hardware configuration of the computer in which the program executes the series of processes described above.

In the computer, a CPU (Central Processing Unit) 201, an ROM (Read Only Memory) 202, and an RAM (Random Access Memory) 203 are connected to each other through a bus 204.

Moreover, an input/output interface 205 is connected to the bus 204. An input unit 206, an output unit 207, a storage unit 208, a communication unit 209, and a drive 210 are connected to the input/output interface 205.

The input unit 206 includes a keyboard, a mouse, a microphone and the like. The output unit 207 includes a display, a speaker and the like. The storage unit 208 includes a hard disk, non-volatile memory and the like. The communication unit 209 includes a network interface and the like. The drive 210 drives a removable recording medium 211 such as a magnetic disk, an optical disk, a magneto-optical disk, or a semiconductor memory.

In the computer configured as above, for example, the CPU 201 loads the program stored in the storage unit 208 into the RAM 203 via the input/output interface 205 and the bus 204 and executes the program, through which the above-described series of processes are performed.

In the computer, the program can be installed in the storage unit 208 via the input/output interface 205 by attaching the removable recording medium 211 to the drive 210. Further, the program can be received by the communication unit 209 via a wired or wireless transmission medium such as a local area network, the Internet, or digital satellite broadcasting, and installed into the storage unit 208. Additionally, the program can be installed in advance in the ROM 202 or the storage unit 208.

Note that the program executed by the computer may be a program that performs the processes in a chronological order in the order described in the present specification, or may be a program that performs the processes in parallel or at necessary timing on occasions of calls, for example.

The steps described in the flowcharts may not only be performed in chronological order in the described order, but also be executed in parallel or at necessary timing on occasions of calls, for example, and the steps are not necessarily processed in chronological order.

In the present specification, the system refers to a collection of a plurality of components (apparatuses, modules (parts) and the like), and it does not matter whether or not all the components are within the same housing. Therefore, a plurality of apparatuses housed in separate housings and connected via a network, and a single apparatus in which a plurality of modules is housed within a single housing is, in either case, the system.

The embodiments of the present technology are not limited to the above-described embodiments, and various modifications can be made without departing from the gist of the present technology.

For example, a mode of combining all or part of the plurality of embodiments described above can be employed.

For example, the present technology can take a configuration of cloud computing in which one function is shared and processed in cooperation by a plurality of apparatuses through a network.

Further, each of the steps described in the above-described flowcharts can be executed by a single apparatus, but can also be shared and executed by a plurality of apparatuses.

Moreover, in a case where a plurality of processes is included in a single step, the plurality of processes included in the single step can be executed by a single apparatus, or can also be shared and executed by a plurality of apparatuses.

Note that the effects described in the present specification are merely illustrative and not limited, and there may be effects other than those described in the present specification.

Note that the present technology can also be configured as below.

(1)

A signal processing apparatus including:

a first position calculation unit that calculates a three-dimensional position of a target on a first coordinate system from a stereo image captured by a stereo camera;

a second position calculation unit that calculates a three-dimensional position of the target on a second coordinate system from a sensor signal of a sensor capable of obtaining position information of at least one of a lateral direction and a longitudinal direction and position information of a depth direction;

a correspondence detection unit that detects a correspondence relationship between the target on the first coordinate system and the target on the second coordinate system; and a positional relationship information estimating unit that estimates positional relationship information of the first coordinate system and the second coordinate system on the basis of the detected correspondence relationship.

(2)

The signal processing apparatus according to (1), in which the correspondence detection unit detects the correspondence relationship after collating individual targets on the first coordinate system and the second coordinate system with prior arrangement information of the target and identifying the target.

(3)

The signal processing apparatus according to (1) or (2), in which the correspondence detection unit detects the correspondence relationship by superimposing the three-dimensional position of the target on the first coordinate system and the three-dimensional position of the target on the second coordinate system over each other and making the targets arranged closest to each other correspond to each other.

(4)

The signal processing apparatus according to any one of (1) to (3), in which the first position calculation unit calculates the three-dimensional position of the target whose motion is detected, and the second position calculation unit calculates the three-dimensional position of the target whose motion is detected.

(5)

The signal processing apparatus according to any one of (1) to (4), in which the first position calculation unit calculates three-dimensional positions of a plurality of the targets from at least one stereo image in one or more frames, the second position calculation unit calculates three-dimensional positions of the plurality of the targets from sensor signals in one or more frames, and the correspondence detection unit detects correspondence relationships between the plurality of the targets.

(6)

The signal processing apparatus according to (5), in which the first position calculation unit calculates three-dimensional positions of a plurality of the targets from a stereo image in one frame, and the second position calculation unit calculates three-dimensional positions of the plurality of the targets from sensor signals in one frame.

(7)

The signal processing apparatus according to any one of (1) to (6), further including:

a storage unit that stores the three-dimensional positions of the target calculated by the first position calculation unit and the second position calculation unit, in which, where a predetermined number or more of three-dimensional positions of the target are accumulated in the storage unit, the correspondence detection unit starts detection of the correspondence relationship.

(8)

The signal processing apparatus according to any one of (1) to (7), in which a plurality of the targets is arranged at different positions in the depth direction.

(9)

The signal processing apparatus according to any one of (1) to (8), in which a plurality of the targets is arranged at different positions in the lateral direction.

(10)

The signal processing apparatus according to any one of (1) to (9), in which a plurality of the targets is arranged at an identical height position.

(11)

The signal processing apparatus according to any one of (1) to (10), in which a plurality of the targets is arranged at positions that are not overlapped with each other when viewed from the stereo camera.

(12)

The signal processing apparatus according to any one of (1) to (10), in which the target is a human.

(13)

The signal processing apparatus according to any one of (1) to (10), in which the target is an object with a predetermined texture.

(14)

The signal processing apparatus according to any one of (1) to (10), in which the target is a pole-like object.

(15)

The signal processing apparatus according to any one of (1) to (14), in which the positional relationship information of the first coordinate system and the second coordinate system is a rotation matrix and a translation vector.

(16)

The signal processing apparatus according to any one of (1) to (15), in which the sensor is a millimeter-wave radar.

(17)

A signal processing method including the steps of:

calculating a three-dimensional position of a target on a first coordinate system from a stereo image captured by a stereo camera;

calculating a three-dimensional position of the target on a second coordinate system from a sensor signal of a sensor capable of obtaining position information of at least one of a lateral direction and a longitudinal direction and position information of a depth direction;

detecting a correspondence relationship between the target on the first coordinate system and the target on the second coordinate system; and estimating positional relationship information of the first coordinate system and the second coordinate system on the basis of the detected correspondence relationship.

(18)

A program for causing a computer to execute a process including the steps of:

calculating a three-dimensional position of a target on a first coordinate system from a stereo image captured by a stereo camera;

calculating a three-dimensional position of the target on a second coordinate system from a sensor signal of a sensor capable of obtaining position information of at least one of a lateral direction and a longitudinal direction and position information of a depth direction;

detecting a correspondence relationship between the target on the first coordinate system and the target on the second coordinate system; and estimating positional relationship information of the first coordinate system and the second coordinate system on the basis of the detected correspondence relationship.

REFERENCE SIGNS LIST

1 Object detection system, 11 Millimeter-wave radar, 12 Stereo camera, 13 Signal processing apparatus, 21L Left camera, 21R Right camera, 31 Target detection unit, 32 Three-dimensional position calculating unit, 33 Target detection unit, 34 Disparity estimation unit, 35 Three-dimensional position calculating unit, 36 Correspondence detection unit, 37 Position and attitude estimation unit, 38 Storage unit, 51 Target, 71 Motion detection unit, 72 Peak detection unit, 73 AND operation unit, 81 Motion area detection unit, 82 Image recognition unit, 83 AND operation unit, 84 Center position calculation unit, 201 CPU, 202 ROM, 203 RAM, 206 Input unit, 207 Output unit, 208 Storage unit, 209 Communication unit, 210 Drive

The invention claimed is:

1. A signal processing apparatus comprising:
   circuitry configured to function as:
      a first position calculation unit that calculates a three-dimensional position of a target on a first coordinate system from a stereo image;
      a second position calculation unit that calculates a three-dimensional position of the target on a second coordinate system from a sensor signal;
      a correspondence detection unit that detects a correspondence relationship between the target on the first coordinate system and the target on the second coordinate system; and
      a positional relationship information estimating unit that estimates positional relationship information of the first coordinate system and the second coordinate system on the basis of the detected correspondence relationship.

2. The signal processing apparatus according to claim 1, wherein the correspondence detection unit detects the correspondence relationship after collating individual targets on the first coordinate system and the second coordinate system with prior arrangement information of the target and identifying the target.

3. The signal processing apparatus according to claim 1, wherein the correspondence detection unit detects the correspondence relationship by superimposing the three-dimensional position of the target on the first coordinate system and the three-dimensional position of the target on the second coordinate system over each other and making the targets arranged closest to each other correspond to each other.

4. The signal processing apparatus according to claim 1, wherein the first position calculation unit calculates the three-dimensional position of the target whose motion is detected, and
   the second position calculation unit calculates the three-dimensional position of the target whose motion is detected.

5. The signal processing apparatus according to claim 1, wherein the first position calculation unit calculates three-dimensional positions of a plurality of the targets from at least one stereo image in one or more frames,
   the second position calculation unit calculates three-dimensional positions of the plurality of the targets from sensor signals in one or more frames, and
   the correspondence detection unit detects correspondence relationships between the plurality of the targets.

6. The signal processing apparatus according to claim 5, wherein the first position calculation unit calculates three-dimensional positions of a plurality of the targets from a stereo image in one frame, and
   the second position calculation unit calculates three-dimensional positions of the plurality of the targets from sensor signals in one frame.

7. The signal processing apparatus according to claim 1, further comprising:
   a storage unit that stores the three-dimensional positions of the target calculated by the first position calculation unit and the second position calculation unit,
   wherein, where a predetermined number or more of three-dimensional positions of the target are accumulated in the storage unit, the correspondence detection unit starts detection of the correspondence relationship.

8. The signal processing apparatus according to claim 1, wherein a plurality of the targets is arranged at different positions in a depth direction.

9. The signal processing apparatus according to claim 1, wherein a plurality of the targets is arranged at different positions in a lateral direction.

10. The signal processing apparatus according to claim 1, wherein a plurality of the targets is arranged at an identical height position.

11. The signal processing apparatus according to claim 1, wherein a plurality of the targets is arranged at positions that are not overlapped with each other when viewed from a stereo camera.

12. The signal processing apparatus according to claim 1, wherein the target is a human.

13. The signal processing apparatus according to claim 1, wherein the target is an object with a predetermined texture.

14. The signal processing apparatus according to claim 1, wherein the target is a pole-like object.

15. The signal processing apparatus according to claim 1, wherein the positional relationship information of the first coordinate system and the second coordinate system is a rotation matrix and a translation vector.

16. The signal processing apparatus according to claim 1, wherein the sensor is a millimeter-wave radar.

17. A signal processing method comprising the steps of: using at least one processor:
   calculating a three-dimensional position of a target on a first coordinate system from a stereo image;
   calculating a three-dimensional position of the target on a second coordinate system from a sensor signal;
   detecting a correspondence relationship between the target on the first coordinate system and the target on the second coordinate system; and
   estimating positional relationship information of the first coordinate system and the second coordinate system on the basis of the detected correspondence relationship.

18. At least one non-transitory computer-readable storage medium encoded with executable instructions that, when executed by at least one processor, cause the at least one processor to perform a method comprising:
   calculating a three-dimensional position of a target on a first coordinate system from a stereo image;
   calculating a three-dimensional position of the target on a second coordinate system from a sensor signal;
   detecting a correspondence relationship between the target on the first coordinate system and the target on the second coordinate system; and
   estimating positional relationship information of the first coordinate system and the second coordinate system on the basis of the detected correspondence relationship.

* * * * *